US012628196B2

(12) United States Patent
Kang et al.

(10) Patent No.: US 12,628,196 B2
(45) Date of Patent: May 12, 2026

(54) DEVICE, METHOD, AND COMPUTER READABLE STORAGE MEDIUM FOR TRANSMITTING AND RECEIVING INFORMATION FOR COMMUNICATION IN LICENCED BAND

(71) Applicant: THINKWARE CORPORATION, Seongnam-si (KR)

(72) Inventors: Jeoungkyu Kang, Seongnam-si (KR); Daewon Kim, Seongnam-si (KR); Taekyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 849 days.

(21) Appl. No.: 17/894,445

(22) Filed: Aug. 24, 2022

(65) Prior Publication Data

US 2023/0070113 A1 Mar. 9, 2023

(30) Foreign Application Priority Data

Aug. 25, 2021 (KR) ......................... 10-2021-0112670

(51) Int. Cl.
| | |
|---|---|
| *H04W 74/0808* | (2024.01) |
| *H04B 17/309* | (2015.01) |
| *H04W 74/00* | (2009.01) |
| *H04W 76/14* | (2018.01) |
| *H04W 92/18* | (2009.01) |

(52) U.S. Cl.
CPC ...... *H04W 74/0808* (2013.01); *H04B 17/309* (2015.01); *H04W 74/002* (2013.01); *H04W 76/14* (2018.02); *H04W 92/18* (2013.01)

(58) Field of Classification Search
CPC ........... H04W 74/0808; H04W 74/002; H04W 92/18; H04W 76/14; H04W 76/23; H04W 4/40; H04B 17/309
See application file for complete search history.

(56) References Cited

U.S. PATENT DOCUMENTS

| | | | | | |
|---|---|---|---|---|---|
| 12,101,806 | B2 * | 9/2024 | Fehrenbach | ...... | H04W 74/0808 |
| 12,120,746 | B2 * | 10/2024 | Aldana | ............. | H04W 74/0833 |
| 2020/0084656 | A1 * | 3/2020 | Nguyen | ................ | H04W 92/18 |
| 2021/0195637 | A1 * | 6/2021 | Xue | ................. | H04W 74/0808 |
| 2021/0400732 | A1 * | 12/2021 | Xue | ........................ | H04W 76/14 |
| 2022/0045807 | A1 * | 2/2022 | Wu | ........................ | H04W 72/20 |
| 2022/0061095 | A1 * | 2/2022 | Xue | ......................... | H04W 80/02 |
| 2022/0070925 | A1 * | 3/2022 | Liu | ...................... | H04B 17/318 |
| 2022/0232392 | A1 * | 7/2022 | Xu | ......................... | H04W 72/23 |
| 2022/0417991 | A1 * | 12/2022 | Farag | ................ | H04W 74/0808 |
| 2023/0007692 | A1 * | 1/2023 | Liu | ......................... | H04W 76/14 |

(Continued)

*Primary Examiner* — Redentor Pasia
(74) *Attorney, Agent, or Firm* — WHDA, LLP

(57) ABSTRACT

According to various embodiments, a first user equipment (UE) includes a transceiver to transmit and receive a wireless signal; and a processor connected with the transceiver, wherein the processor is configured to identify a value related to quality of sidelink communication while the first UE performs sidelink communication in licensed band with a second UE, determine to perform a listen before talk (LBT) procedure on a condition that the value related to the quality of the sidelink communication is less than or equal to a reference value, and perform the LBT procedure during performing the sidelink communication in the licensed band.

20 Claims, 21 Drawing Sheets

(56)　　　　　References Cited

U.S. PATENT DOCUMENTS

| 2023/0111152 A1* | 4/2023 | Liu | ...................... H04L 5/0053 |
| | | | 370/330 |
| 2023/0164873 A1* | 5/2023 | Hahn | ................ H04W 52/0216 |
| | | | 370/328 |
| 2023/0269769 A1* | 8/2023 | Ganesan | ........... H04W 74/0808 |
| | | | 370/328 |
| 2025/0150212 A1* | 5/2025 | Pan | ........................ H04L 1/188 |

* cited by examiner

UE 2
(802)

UE 3
(803)

UE 4
(804)

UE 1
(801)

UE 5
(805)

UE 6
(806)

UE 7
(807)

START

TRANSMIT FIRST MESSAGE INCLUDING RANDOM ACCESS PREAMBLE BASED ON LBT PROCEDURE ~1610

RECEIVE SECOND MESSAGE FROM SECOND USER EQUIPMENT ~1620

TRANSMIT SCHEDULED THIRD MESSAGE BASED ON LBT PROCEDURE ~1630

RECEIVE FOURTH MESSAGE FROM SECOND USER EQUIPMENT ~1640

ESTABLISH SIDELINK CONNECTION WITH SECOND USER EQUIPMENT WITHIN LICENSED BAND ~1650

END

1800

1816   1802   1804   1812   1806
              1808

210

220

240

DEVICE, METHOD, AND COMPUTER READABLE STORAGE MEDIUM FOR TRANSMITTING AND RECEIVING INFORMATION FOR COMMUNICATION IN LICENCED BAND

CROSS-REFERENCE TO RELATED APPLICATIONS

This application is based on and claims priority under 35 U.S.C. § 119 to Korean Patent Application No. 10-2021-0112670, filed on Aug. 25, 2021, in the Korean Intellectual Property Office, the disclosure of which is incorporated by reference herein in its entirety.

BACKGROUND

Technical Field

The following descriptions relate to a device, a method, and a computer readable storage medium for performing communication in a licensed band.

Description of Related Art

After the first generation mobile communication, in which only voice signals are transmitted and received in the past, mobile communication has evolved to the present fifth generation (hereinafter referred to as 5G) mobile communication. The 5G mobile communication technology has been developed with the goal of enhanced mobile broadband (eMBB), ultra-reliable & low latency communication (URLLC), and machine-type communications (mMTC).

Currently, development for system network improvement is in progress based on advanced small cell, cloud radio access network (RAN), ultra-dense network, device-to-device (D2D) communication, wireless backhaul, mobile network, cooperative communication, coordinated multi-point (CoMP) transmission and reception, interference mitigation and cancellation, and the like.

5G mobile communication technology is a new radio access technology (RAT) and is called NR (new radio). NR may support vehicle to everything (V2X) communication (i.e., C(Cellular)-V2X communication).

V2X is a communication technology that exchanges information between pedestrians, objects, and vehicles through wired/wireless communication. V2X may be divided into various types. Specifically, V2X may be divided into types of vehicle to vehicle (V2V), vehicle to infrastructure (V2I), vehicle to network (V2N), and vehicle to pedestrian (V2P). V2V refers to communication between a vehicle and a vehicle, V2I refers to communication between a vehicle and an infrastructure, V2N refers to communication between a vehicle and a network, and V2P refers to communication between a vehicle and a pedestrian.

SUMMARY

For C (Cellular)-V2X communication, discussion for the integrity (or URLLC) of the communication connection is currently in progress, but the procedure for securing the amount of transmitted data (or the amount of received data) is not defined. Accordingly, a method for securing the amount of data may be required.

The spectrum for C-V2X communication (i.e., licensed band) and unlicensed band are set separately, and most of the signal exchange during C-V2X communication take place in the licensed band, but an error in communication and a sharp drop in reliability may occur due to an external obstacle or the like. C-V2X communication is basically communication between a vehicle and an object, and reliability and low latency of a signal may be essentially required.

Since an unlicensed band and a licensed band are adjacent, interference caused by communication in the unlicensed band may occur even on the licensed band. Therefore, when continuous interference caused by the unlicensed band occurs, it may be required to perform a listen-before-talk (LBT) procedure even within the licensed band such as communication in the unlicensed band.

The technical problems to be achieved in this document are not limited to those described above, and other technical problems not mentioned herein will be clearly understood by those having ordinary knowledge in the art to which the present disclosure belongs, from the following description.

According to various embodiments, a first user equipment (UE) may comprise a transceiver to transmit and receive a wireless signal; and a processor connected with the transceiver, wherein the processor may be configured to identify a value related to quality of sidelink communication while the first UE performs sidelink communication in licensed band with a second UE, determine to perform a listen before talk (LBT) procedure on a condition that the value related to the quality of the sidelink communication is less than or equal to a reference value, and perform the LBT procedure during performing the sidelink communication in the licensed band.

According to various embodiments, a method for operating a first user equipment (UE) may comprise identifying a value related to quality of sidelink communication while the first UE performs sidelink communication in licensed band with a second UE, determining to perform a listen before talk (LBT) procedure on a condition that the value related to the quality of the sidelink communication is less than or equal to a reference value, and performing the LBT procedure during performing the sidelink communication in the licensed band.

According to various embodiments, a non-transitory computer readable medium may store one or more programs, wherein the one or more programs may include instructions which, when being executed by at least one processor of a first user equipment (UE), cause the first UE to identify a value related to quality of sidelink communication while the first UE performs sidelink communication in licensed band with a second UE, determine to perform a listen before talk (LBT) procedure on a condition that the value related to the quality of the sidelink communication is less than or equal to a reference value, and perform the LBT procedure during performing the sidelink communication in the licensed band.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

Figure 1:
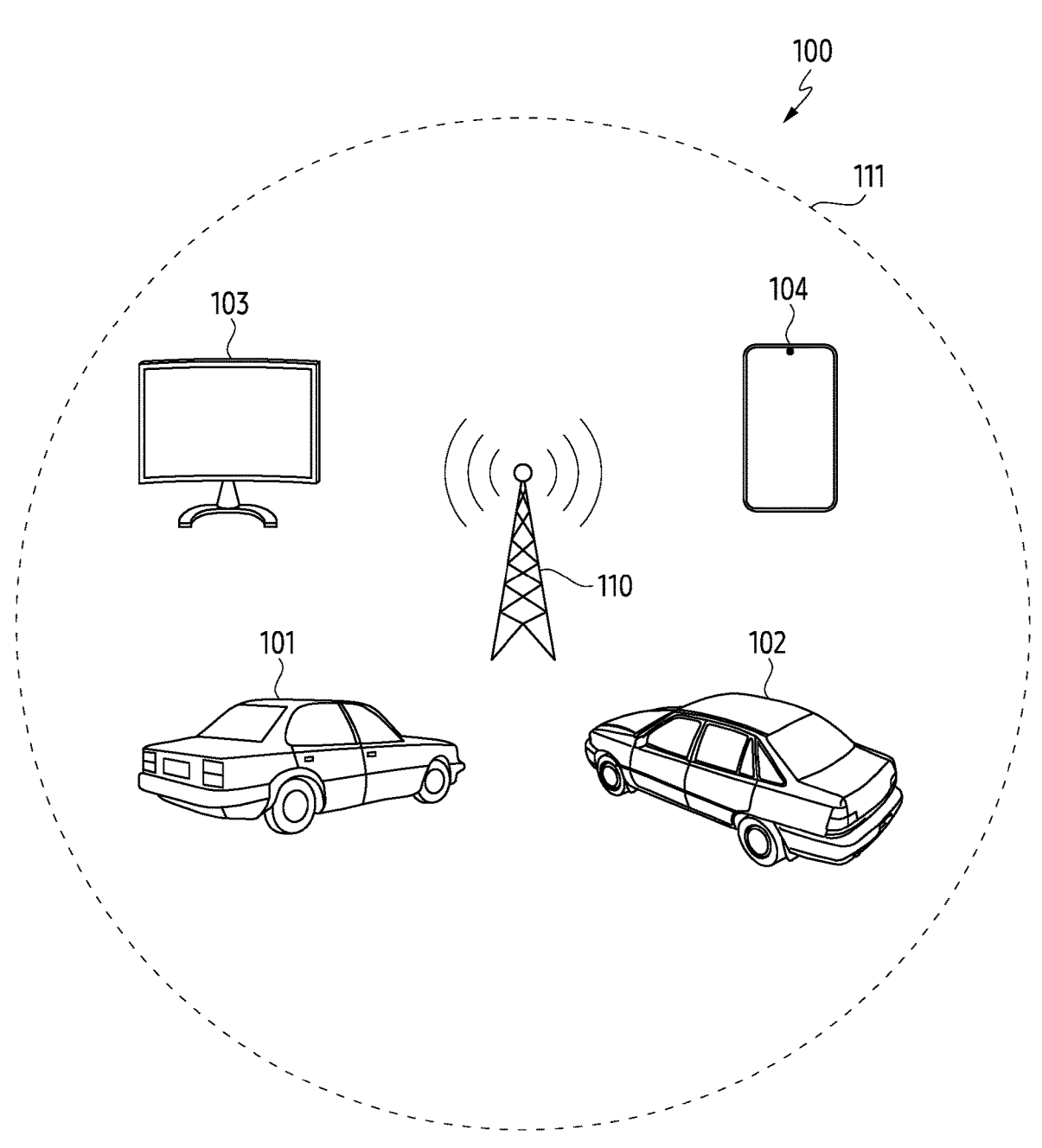
FIG. 1 illustrates a basic conceptual diagram of mobile communication.

According to various embodiments, a licensed band adjacent to an unlicensed band may be used for sidelink communication. On the licensed band adjacent to the unlicensed band, interference caused by communication in the unlicensed band may occur. Accordingly, a user equipment can identify a value related to the quality of the sidelink communication on the licensed band. The user equipment can perform an LBT procedure on a condition that a value related to the quality of the sidelink communication is equal to or less than a reference value. Accordingly, the user equipment can preliminarily perform the LBT procedure during performing the sidelink communication in the licensed band.

Hereinafter, various embodiments of the present document will be described with reference to the accompanying drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include anyone of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or portion thereof, adapted to perform one or more functions. For example, according to an embodiment, the module may be implemented in a form of an application-specific integrated circuit (ASIC).

FIG. 1 illustrates a basic conceptual diagram of mobile communication.

Referring to FIG. 1, a mobile communication system 100 may include a network for performing communication by an electronic device. The network may be configured in various ways. For example, the network may be configured as NR, long term evolution (LTE), LTE-advanced (LTE-A), or wireless LAN (e.g., Wi-Fi 802.11a/b/g/n/a/ax/be).

The electronic device may include vehicles 101 and 102, a TV 103, and a smartphone 104. The electronic device (e.g., the vehicle 101, the vehicle 102, the TV 103, and the smartphone 104) illustrated in FIG. 1 are exemplary, and the electronic device may include various devices. For example, the electronic device may include a home appliance, a server, an Internet of Thing (IOT) device, a computer, a laptop, and the like. The electronic device may include a mobile equipment (ME) that integrates a universal subscriber identity module (USIM), a universal integrated circuit card (UICC), or an embedded UICC (eUICC).

The electronic device may be variously referred to according to the type of the network. The electronic device may be referred to as user equipment (hereinafter, UE), a mobile station, a subscriber station, a wireless terminal (or device), or the like.

The electronic device may be connected to the base station 110. The base station 110 may include various devices or nodes for wireless communication. For example, the base station 110 may include a transmit point (TP), transmit-receive point (TRP), enhanced base station (or eNB), a 5G base station (gNB), an access point (AP), and the like.

A coverage 111 may indicate a limit area in which a signal may be transmitted and received through the base station 110. The coverage 111 illustrated in FIG. 1 is illustrated in a circular shape, but is not limited thereto. The coverage 111 may be configured in various forms according to various situations. In addition, the coverage 111 does not mean only a two-dimensional area, but may be configured to a three-dimensional space (e.g., a hemisphere or a sphere).

The electronic device may perform communication through the base station 110, and the electronic devices may be directly connected to each other without passing through the base station.

For example, the vehicle 101 and the vehicle 102 may be directly connected to each other without passing through the base station 110. As an example, the vehicle 101 and the vehicle 102 may transmit and receive data through sidelink communication.

As another example, the TV 103 and the smartphone 104 may transmit and receive data to and from each other through various wireless communication (e.g., Bluetooth or Wi-Fi) without passing through the base station 110.

The mobile communication system 100 of FIG. 1 illustrates an example configured with one base station 110, but is not limited thereto. The mobile communication system 100 may include a plurality of base stations including the base station 110. Each of the plurality of base stations may be connected to a plurality of electronic devices, and the electronic devices connected to different base stations may communicate with each other.

According to an embodiment, the first electronic device connected to the first base station among a plurality of base stations may go out of the coverage of the first base station. The first electronic device may go out of the coverage of the first base station and enter the coverage of the second base station among the plurality of base stations. The first electronic device may perform a handover procedure for releasing a connection with a first base station and establishing a connection with a second base station. After the handover procedure is completed, the first electronic device may perform communication through the second base station.

Hereinafter, for convenience of description, the base station may be described as a base station (BS). In addition, the electronic device connected to the base station may be described as a user equipment (UE).

Figure 2:
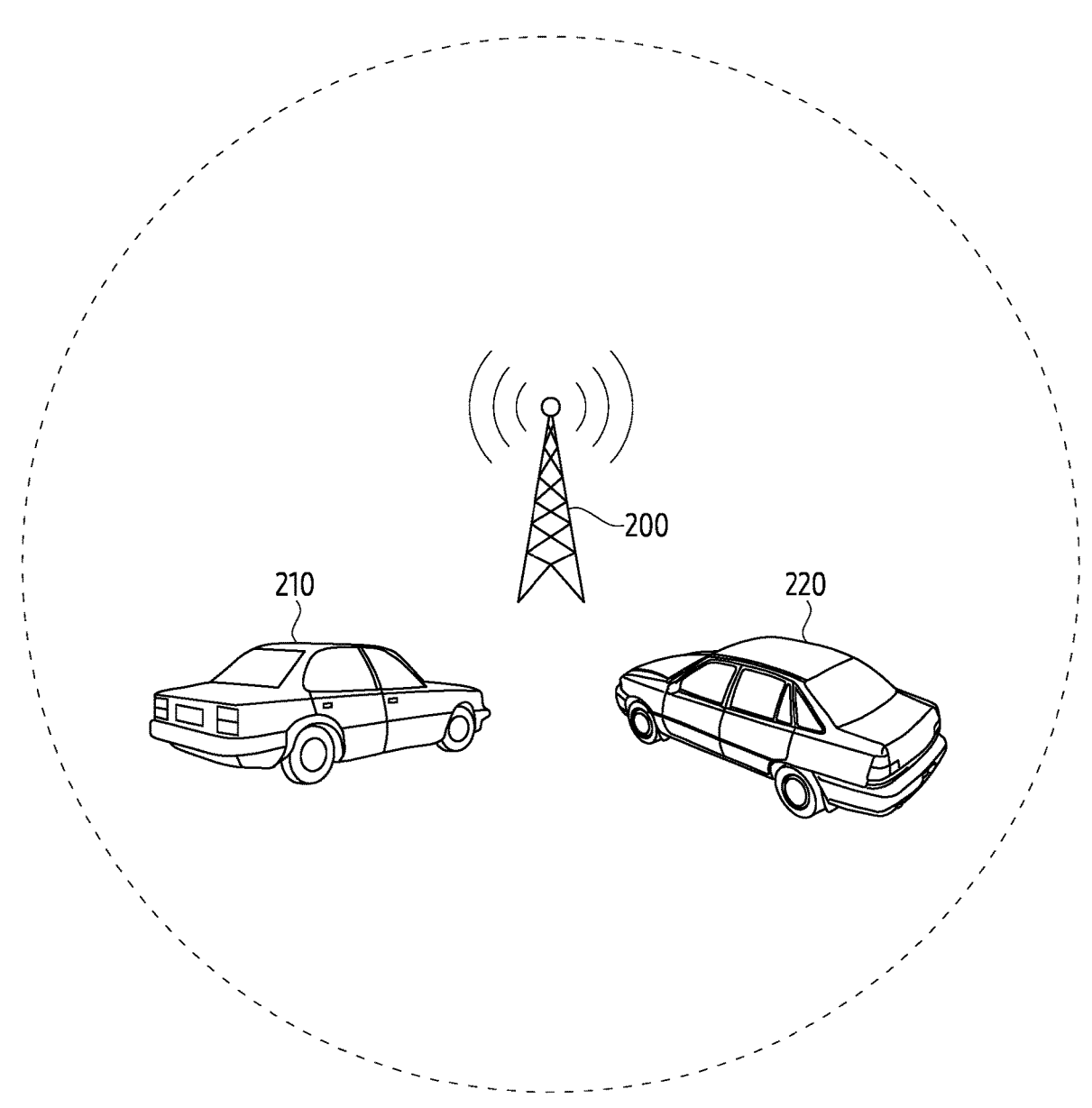
FIG. 2 is a diagram for describing an example of sidelink communication in NR.

FIG. 2 is a diagram for describing an example of sidelink communication in NR.

Referring to FIG. 2, the UE 1 210 and the UE 2 220 may directly perform sidelink communication without passing through the BS 200. The UE 1 210 and the UE 2 220 may be in a state connected to the BS 200. In other words, the UE 1 210 and the UE 2 220 may be located within the coverage of the BS 200.

According to an embodiment, the UE 1 210 and the UE 2 220 may receive information on a resource (or information on resource scheduling) to perform the sidelink communication from the BS 200. The UE 1 210 and the UE 2 220 may identify a resource to perform sidelink communication based on information on a resource to perform sidelink communication received from the BS 200. The UE 1 210 and the UE 2 220 may perform sidelink communication through the identified resource.

Specifically, the BS 200 may include information on a plurality of resources in a downlink control information (DCI) through a physical downlink control channel (PDCCH) and transmit the information. A detailed description of the DCI will be described later.

Figure 3:
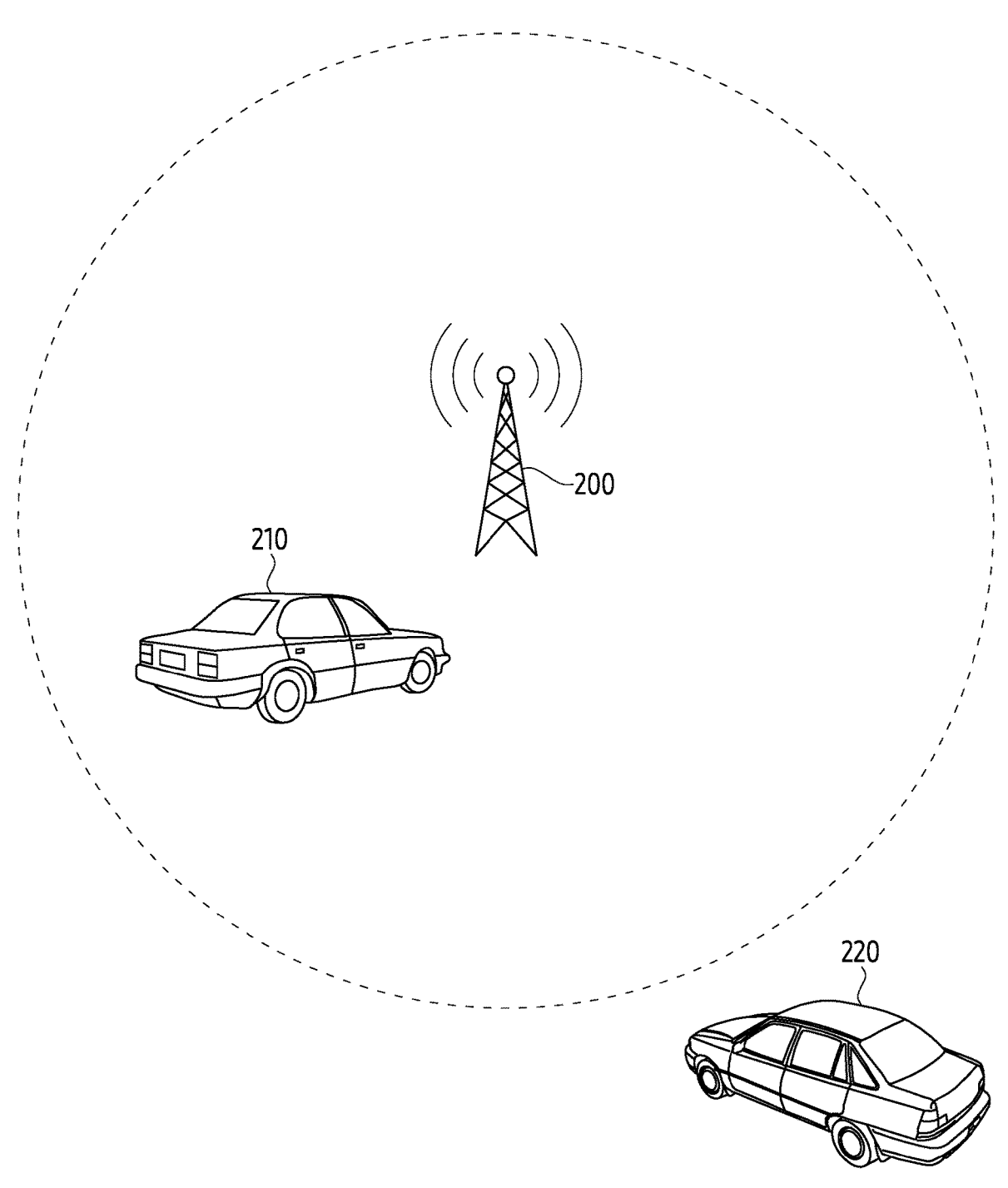
FIG. 3 is a diagram for describing another example of sidelink communication in NR.

FIG. 3 is a diagram for describing another example of sidelink communication in NR.

Referring to FIG. 3, unlike FIG. 2, only the UE 1 210 may be connected to the BS 200, and the UE 2 220 may not be connected to the BS 200.

According to an embodiment, only the UE 1 210 of the UE 1 210 and the UE 2 220 may receive information (or information on a resource pool) on a plurality of resources from the BS 200. The UE 1 210 may select a resource unit from among a plurality of resources and transmit a signal to the UE 2 220 through the selected resource. In addition, the UE 2 220 may identify a resource selected by the UE 1 210 and perform sidelink communication through the resource selected by the UE 1.

In FIG. 3, an embodiment of receiving information on a plurality of resources through the BS 200 when only the UE 1 210 is connected to the BS 200 and the UE 2 220 is not connected to the BS 200 has been described, but the above embodiment may be applied to the situation of FIG. 2.

Specifically, the UE 1 210 may perform sidelink communication by transmitting the SCI (sidelink control information) to the UE 2 220 through the PSCCH (physical sidelink shared channel) and transmitting data to the UE 2 220 through the PSSCH (physical sidelink shared channel) based on the SCI. A detailed description of the SCI will be described later.

Hereinafter, the DCI and the SCI may be described.

First, an example of a DCI format may be described. The DCI format may be configured as illustrated in Table 1 below.

TABLE 1

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

Referring to Table 1, the DCI format may include a DCI format 0, a DCI format 1, and a DCI format 2.

The DCI format 0 may include a DCI format 0_0, a DCI format 0_1 and a DCI format 0_2. The DCI format 0 may be used in uplinks.

The DCI format 0_0 may be used for scheduling the PUSCH in one cell (or uplink (UL) cell). The DCI format 0_1 may be used for scheduling one or more PUSCHs in one cell. The DCI format 0_1 may be used to indicate downlink feedback information (DFI) for configured grant PUSCH. The DCI format 0_0 and the DCI format 0_1 may be used for eMBB.

The DCI format 0_2 may be used for scheduling the PUSCH in one cell. The DCI format 0_2 may be used for URLLC.

Meanwhile, in the unlicensed band (or sharing spectrum), the DCI format 0 may include information different from the above-described information.

For example, the DCI formats 0_0 and 0_1 may include an indicator indicating a channel access type.

For example, in the unlicensed band, the DCI format 0_1 may include an indicator indicating whether it is downlink feedback indication (DFI) or uplink grant.

The DCI format 1 may include a DCI format 1_0, a DCI format 1_1 and a DCI format 1_2. The DCI format 1 may be used in downlink.

The DCI format 1_0 may be used for scheduling a PDSCH in one cell (or a downlink (DL) cell). The DCI format 1_1 may be used for scheduling the PDSCH in one cell. DCI format 1_1 may be used to trigger one shot HARQ (hybrid automatic repeat and request)-ACK (acknowledgement) codebook feedback. The DCI format 1_0 and the DCI format 1_1 may be used for eMBB.

The DCI format 1_2 may be used for scheduling the PDSCH in one cell. The DCI format 1_2 may be used for URLLC.

Meanwhile, in an unlicensed band (or sharing spectrum), the DCI format 1 may include information different from the above-described information. For example, the DCI formats 1_0 and 1_1 may include an indicator indicating a channel access type.

The DCI format 2 may include a DCI format 2_0, a DCI format 2_1, a DCI format 2_2, a DCI format 2_3, a DCI format 2_4, a DCI format 2_5, and a DCI format 2_6. The DCI format 2 may be used for special purposes.

The DCI format 2_0 may be used to inform a slot format, a channel occupancy time (COT) duration, a possible resource block (RB) sets, and a search space set group switching.

For example, the DCI format 2_0 may include a slot format indicator. The slot format indicator may indicate whether a symbol is DL, UL, or flexible in the corresponding slot.

Meanwhile, in the unlicensed band, the DCI format 2_0 may be used in the same format. However, information indicated by the DCI format 2_0 may be changed. For example, through DCI format 2_0, in which band the channel is occupied may be indicated for each resource. In other words, the DCI format 2_0 may include information indicating whether a corresponding channel is empty.

The DCI format 2_1 may be used to inform a physical resource block (PRB)(s) and OFDM symbol(s) that the UE assume will not transmit under its own intention. In other words, the DCI format 2_1 may include information for indicating not to listen to a signal in a corresponding slot.

The DCI format 2_2 may be used to transmit a transmit power control (TPC) command for PUCCH and PUSCH. In other words, the DCI format 2_2 may be used for uplink power control.

The DCI format 2_3 may be used to transmit a group of TPC commands for sounding reference signal (SRS) transmission by one or more UEs. In other words, the DCI format 2_3 may be used for uplink power control.

The DCI format 2_4 may be used to inform the PRB(s) and OFDM symbol(s) that cancel uplink transmission. In other words, the DCI format 2_4 may include an uplink cancellation indicator.

The DCI format 2_5 may be used to inform availability of soft resource. In other words, the DCI format 2_5 may include an indicator for IAB node support.

The DCI format 2_6 may be used to inform power saving information outside a DRX (Discontinuous Reception) activation time (DRX active time) for one or more UEs. In other words, the DCI format 2_6 may include a DRX activation indicator.

The DCI format 3 may include a DCI format 3_0 and a DCI format 3_1.

The DCI format 3_0 may be used for NR sidelinks in one cell.

The DCI format 3_1 may be used for a long-term evolution (LTE) sidelink in one cell.

Hereinafter, an example of an SCI format may be described.

The above-described DCI refers to control information transmitted by the BS to the UE through the PDCCH, but the SCI may refer to control information that the UE transmits to another UE through the PSCCH. The SCI may be transmitted in two steps, and a detailed operation related thereof may be described below.

The first UE may transmit the first SCI (e.g., 1st-stage SCI) to the second UE through the PSCCH. The first SCI may include information for scheduling the PSSCH. Thereafter, the first UE may transmit the second SCI.

The second SCI may be transmitted to the second UE through the PSSCH. The second UE may identify information for scheduling the PSSCH and decode the second SCI based on the first SCI. For example, the second SCI may be piggybacked together with data through the PSSCH and transmitted to the second UE.

Meanwhile, the first SCI transmitted through the PSCCH may be used to schedule the second SCI and the PSSCH. The first SCI may include SCI format 1-A.

Meanwhile, the second SCI transmitted through the PSSCH may be used to transmit sidelink scheduling information. The second SCI may include a SCI format 2-A and/or a SCI format 2-B. The SCI format 2-A and the SCI format 2-B may be used to decode the PSSCH.

Hereinafter, a frequency band used in NR may be described.

A frequency band (or frequency range) used in NR may be divided into a first type and a second type. The first type of frequency band may be referred to as FR (Frequency Range) 1. The second type of frequency band may be referred to as FR 2.

For example, the ranges of the first type frequency band and the second type frequency band may be configured as illustrated in Table 2.

TABLE 2

| Frequency Range designation | Corresponding frequency range | Subcarrier Spacing (SCS) |
|---|---|---|
| FR 1 | 450 MHz-6000 MHz | 15, 30, 60 kHz |
| FR 2 | 24250 MHz-52600 MHz | 60, 120, 240 kHz |

Referring to Table 2, the FR 1 may be configured in a band of 450 MHz to 6000 MHz. The FR 2 may be configured in a band of 24250 MHz to 52600 MHz. The specific frequency values described in Table 2 are exemplary and may be changed.

Figure 4:
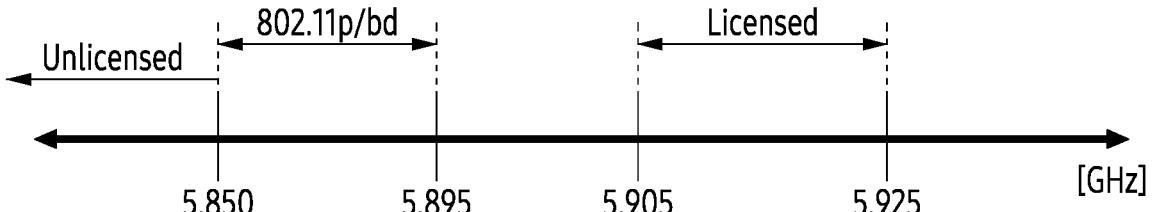
FIG. 4 illustrates a band plan of 5.9 GHz.

FIG. 4 illustrates a band of 5.9 GHz.

Referring to FIG. 4, the 5.9 GHz band may include an unlicensed band and a licensed band. The specific frequency range illustrated in FIG. 4 may be set differently for each country and may be changed.

For example, 20 MHz, from 5.905 GHz to 5.925 GHz, may be set as the licensed band and maybe be used for V2X communication (or C-V2X communication). In addition to the licensed band of 20 MHz, 10 MHz from 5.895 GHz to 5.905 GHz may also be set as the licensed band.

For example, 45 MHz from 5.850 GHz to 5.895 GHz may be used for wireless Internet (e.g., 802.11p/bd).

A band equal to or less than 5.850 GHz or greater than 5.925 GHz may be set as the unlicensed band. The unlicensed band may be used for a various purposes, and for example, it may be used for communication for a vehicle (e.g., self-driving). The unlicensed band may be referred to as a sharing spectrum.

According to various embodiments, a spectrum of a band for C-V2X communication and an unlicensed band are set separately, but the unlicensed band may be used to secure the amount of transmitted and received data in C-V2X communication.

Accordingly, in the following specification, various embodiments for using an unlicensed band in sidelink communication (e.g., C-V2X communication) may be described.

According to various embodiments, a user equipment may perform communication in an unlicensed band with a base station. For example, the user equipment may use the unlicensed band together with a licensed band. As another example, the user equipment may perform communication in the unlicensed band through a NR base station and may perform communication in the licensed band together through an LTE base station. Various embodiments of an operation in which the user equipment performs communication with the base station on the unlicensed band may be described with reference to FIG. 5 to FIG. 7. The user equipment described below may be referred to as a UE. In addition, the base station described below may be referred to as a BS.

In the following description, an example in which the first user equipment and the second user equipment operate a licensed band and an unlicensed band to transmit and receive data through sidelink communication will be described according to another embodiment.

For example, when performing sidelink communication, the first user equipment and the second user equipment may transmit and receive low-capacity data below the threshold through the licensed band, and large-capacity data above the threshold may be transmitted and received through the unlicensed band.

For example, when performing sidelink communication, the first user equipment and the second user equipment may transmit and receive data having high reliability through the licensed band, and may transmit and receive data having somewhat low reliability through the unlicensed band. In this case, the data having high reliability may include personal information on the user equipment user, login information, financial information, payment information, and the like.

For example, when performing sidelink communication, the first user equipment and the second user equipment may transmit and receive data requiring encryption through the licensed band, and may transmit and receive data not requiring encryption through the unlicensed band. In this case, the data requiring encryption may include personal information on the user equipment user, login information, financial information, payment information, and the like.

For example, when performing sidelink communication, the first user equipment and the second user equipment may transmit and receive data requiring urgency through the licensed band, and may transmit and receive data not requiring urgency through the unlicensed band. In this case, the data requiring urgency may include disaster information, emergency information, accident information, emergency braking information, and the like.

For example, when performing sidelink communication, the first user equipment and the second user equipment may transmit and receive data related to the software update notification of the vehicle through the licensed band, and may transmit and receive data for software update of the vehicle through the unlicensed band.

For example, when performing sidelink communication, the first user equipment and the second user equipment may transmit and receive data that attribute is mandatory through the licensed band, and transmit and receive data that attribute is optional through the unlicensed band.

For example, when performing sidelink communication, the first user equipment and the second user equipment may transmit and receive upload data through the licensed band, and may transmit and receive download data through the unlicensed band.

For example, when performing sidelink communication, the first user equipment and the second user equipment may transmit and receive a resource indicator indicating a resource for communication through a licensed band, and may transmit and receive data through resources included in the unlicensed band. Specifically, the first user equipment and the second user equipment may transmit and receive data through the resource of the unlicensed band indicated by the resource indicator transmitted and received through the licensed band.

For example, equipment when performing sidelink communication, the first user equipment and the second user equipment may transmit and receive control information for the first user equipment to control the second user through the license band, may transmit and receive ACK/NACK information or feedback information on the control information through the unlicensed band.

An example in which the above-described the first user equipment and the second user equipment operate the licensed band and the unlicensed band through sidelink communication is only an embodiment, and as the opposite case to the above-described example, the licensed band and the unlicensed band may be operated.

Figure 5:
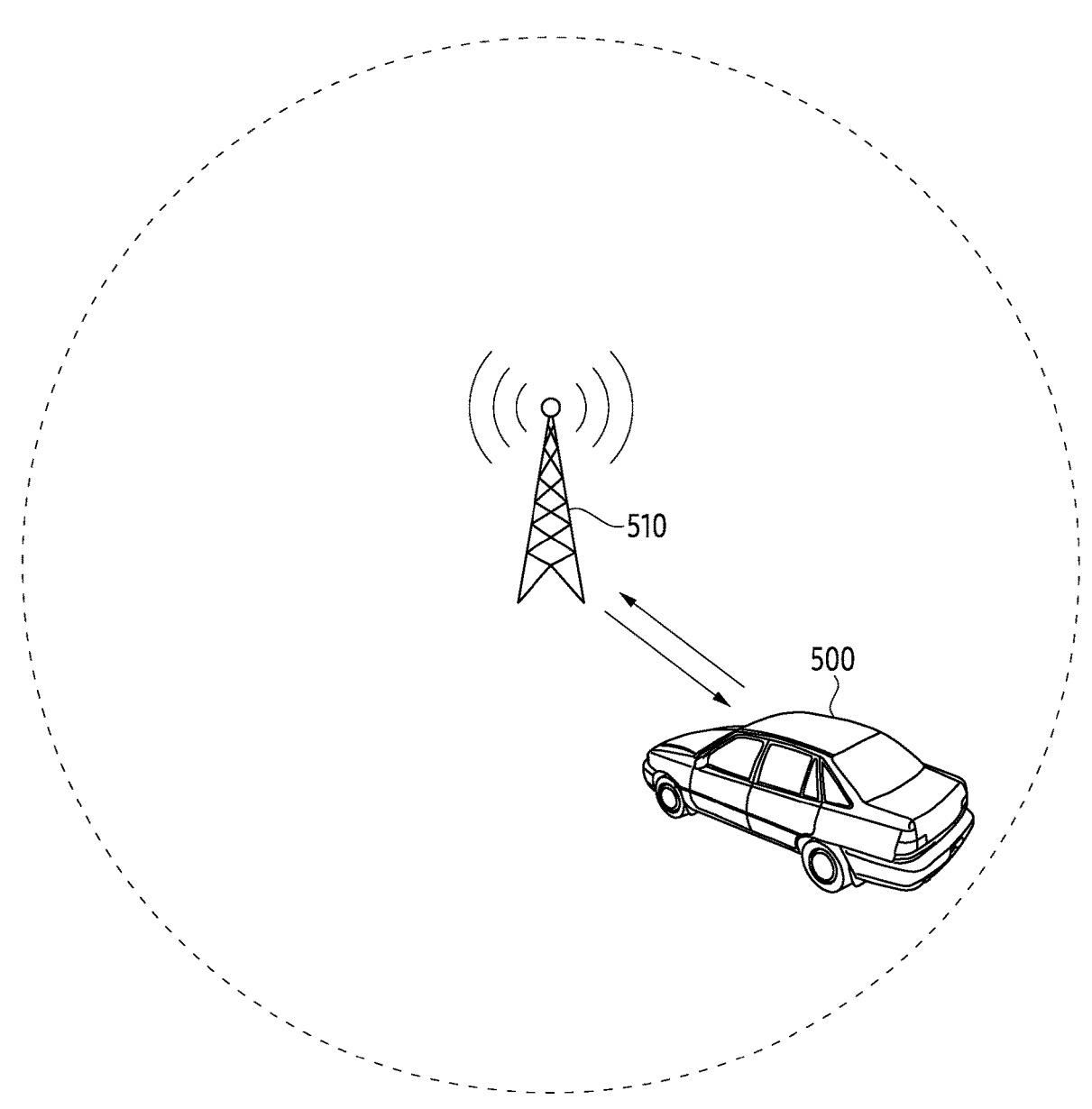
FIG. 5 illustrates an example of communication between a UE 1 and a BS on an unlicensed band according to various embodiments.

FIG. 5 illustrates an example of communication between a UE 1 and a BS on an unlicensed band according to various embodiments.

Referring to FIG. 5, the UE 1 500 may perform communication on the unlicensed band with the BS 510. The BS 510 may perform NR communication. For example, the BS 510 may include gNodeB (gNB). In other words, the UE 1 500 may operate as a standalone (SA) within the unlicensed band.

Accordingly, the UE 500 may transmit a control message and user data to the BS 510 or receive the control message and the user data from the BS 510. Although not illustrated, the UE 1 500 may be connected to a 5G core network through the BS 510.

For example, the control message may include a message related to at least one of security control of the UE 1 500, bearer setting, authentication, registration, and/or mobility management.

For example, the user data may include data transmitted except for the control message transmitted and received between the UE 1 500 and the core network.

Unlike FIG. 5, the UE may simultaneously be connected to the LTE base station and the NR base station to perform communication. A detailed operation related thereto may be described with reference to FIG. 6.

Figure 6:
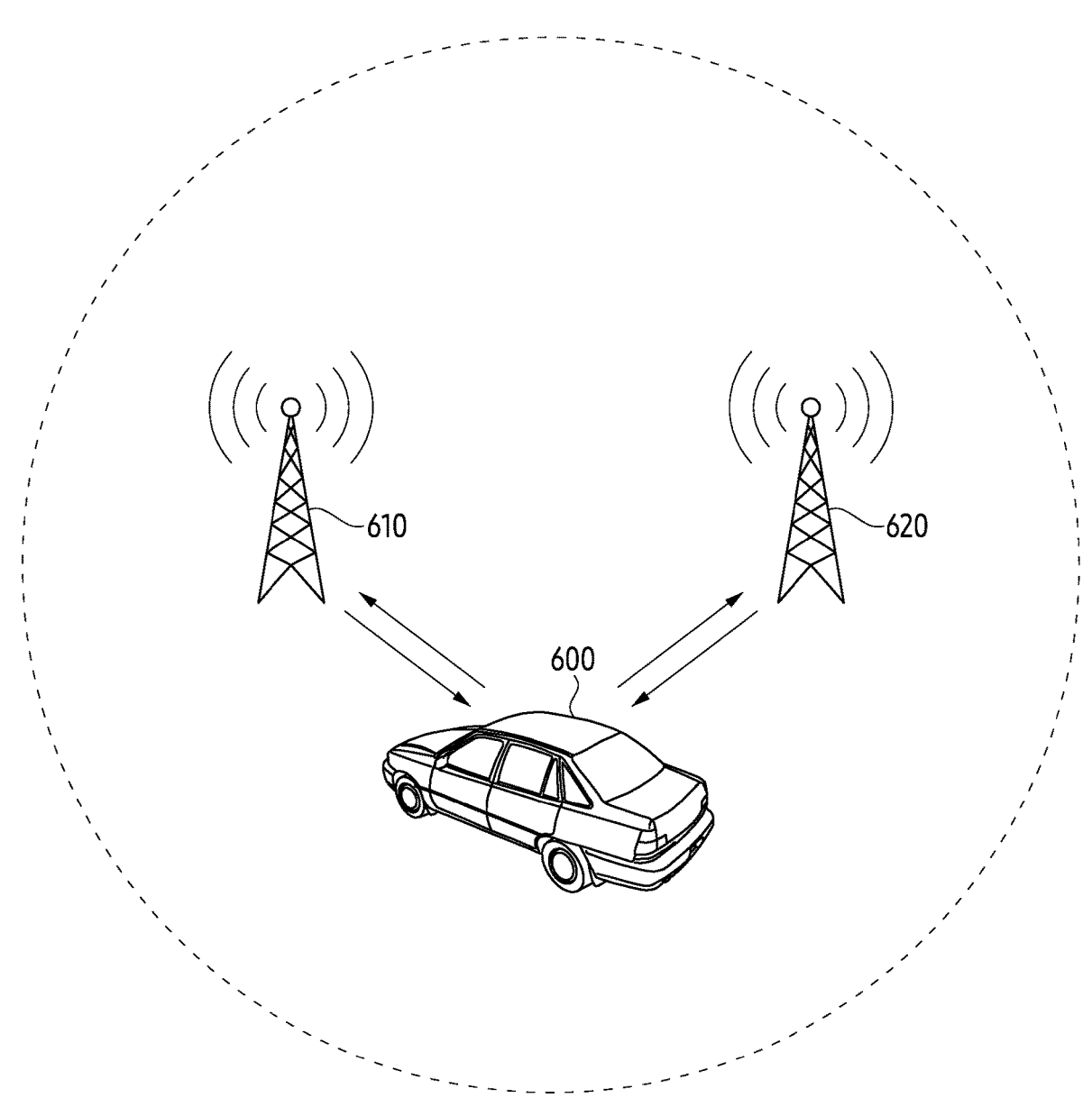
FIG. 6 illustrates an example of communication between a UE and a BS on an unlicensed band according to various embodiments.

FIG. 6 illustrates an example of communication between a UE and a BS on an unlicensed band according to various embodiments.

Referring to FIG. 6, the UE 1 600 may support dual connectivity. The UE 1 600 may be connected to a plurality of different base stations through dual connectivity. In addition, the UE 1 600 may increase frequency use efficiency by simultaneously using carrier waves in the plurality of base stations.

The UE 1 600 may perform NR communication on the unlicensed band with the BS 610. For example, the BS 610 may include gNodeB (gNB). In addition, the UE 1 600 may perform LTE communication with the BS 620. For example, the BS 620 may include eNodeB (eNB). The BS 610 and the BS 620 may be configured as the same base station, and in this case, the UE 1 600 may operate as a non-standalone (NSA).

Although not illustrated, the BS 610 may be connected to a 5th generation core (5GC). The BS 620 may be connected to an evolved packet core (EPC).

The UE 1 600 may establish a connection with the BS 610 and the BS 620 and may communicate with one of the BS 610 and the BS 620. In addition, the UE 1 600 may establish a connection with the BS 610 and the BS 620 and may perform communication through all of the BS 610 and the BS 620.

For example, the UE 1 600 may perform radio resource control (RRC) access through the BS 620 and may receive a function provided on a control plane. In addition, the UE 1 600 may be allocated additional resources within the unlicensed band through the BS 610.

FIG. 6 illustrates an example in which two base stations are each composed of the LTE base station and the 5G base station, but is not limited thereto. One base station may perform both functions of the LTE base station and the 5G base station.

According to an embodiment, the UE may simultaneously use the unlicensed band and the licensed band. A detailed operation related thereto may be described with reference to FIG. 7.

Figure 7:
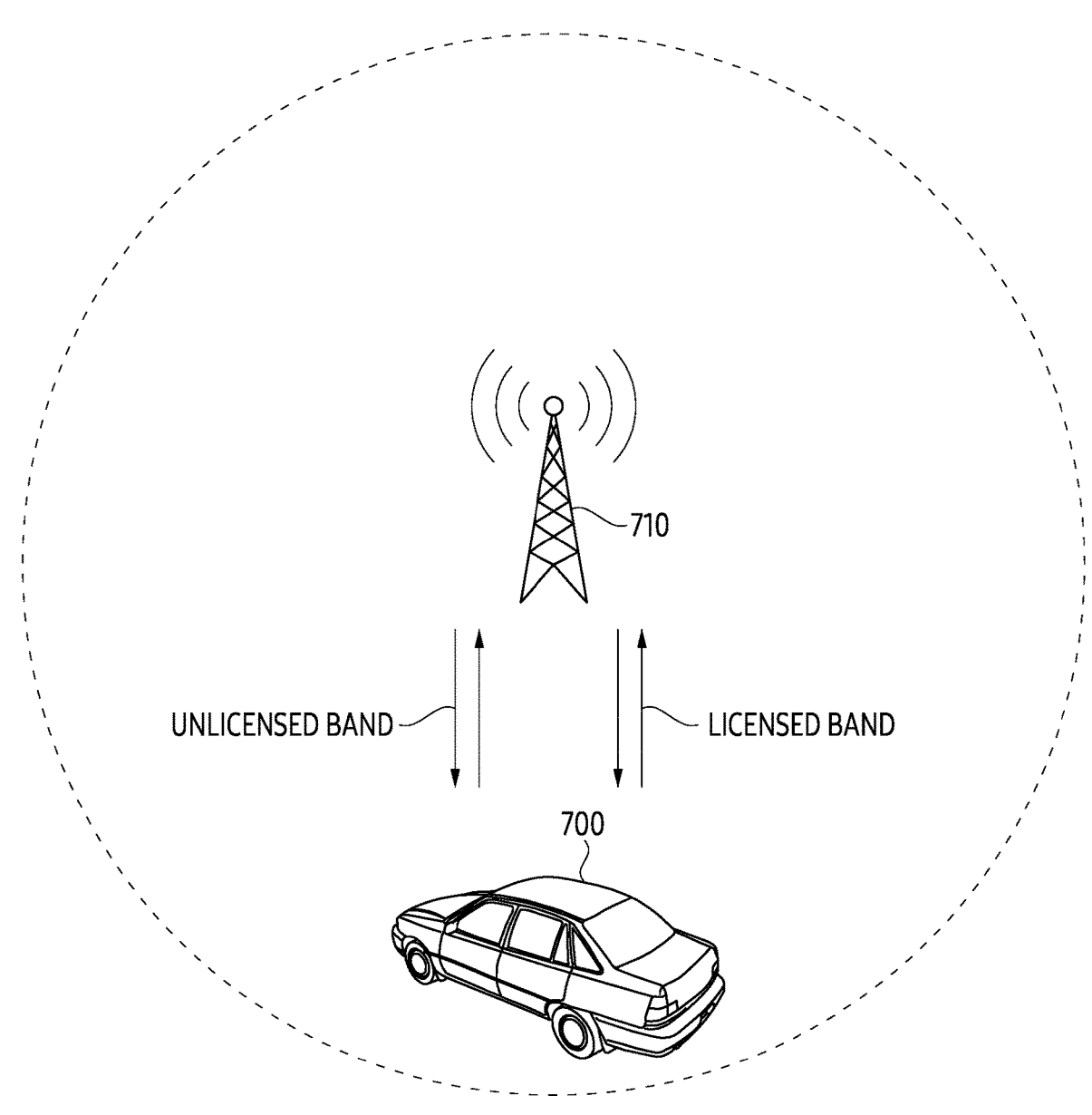
FIG. 7 illustrates an example of communication between a UE and a BS on an unlicensed band according to various embodiments.

FIG. 7 illustrates an example of communication between a UE and a BS on a licensed band and an unlicensed band according to various embodiments.

Referring to FIG. 7, the UE 1 700 may perform NR communication on the unlicensed band with the BS 710. The UE 1 700 may also perform NR communication on the licensed band with the BS 710. The UE 1 700 may support carrier aggregation (CA). The UE 1 700 may perform communication through a plurality of aggregated carriers.

For example, a component carrier (CC) on the unlicensed band may be set as a primary CC (PCC). A component carrier on the licensed band may be set to a secondary CC (SCC). The UE 1 700 may perform communication through the PCC and the SCC. For example, the control information may be transmitted and received through the PCC. Data may be transmitted and received through the PCC and/or the SCC.

Figure 8:
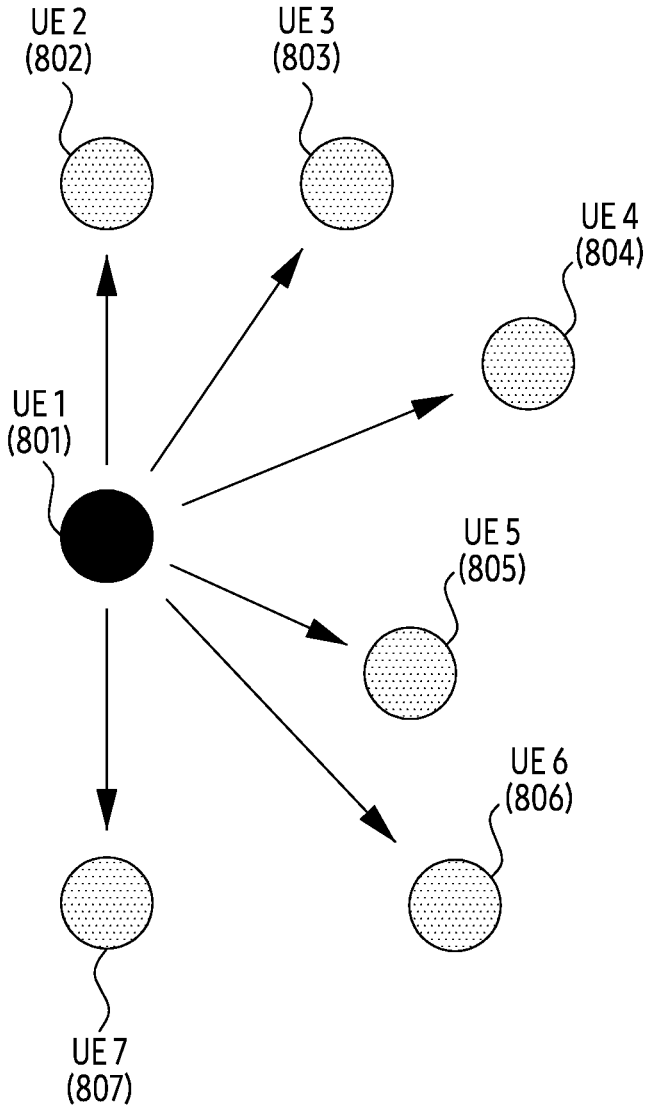
FIG. 8 illustrates an example in which a UE transmits a signal in a broadcast.

FIG. 8 illustrates an example in which a UE transmits a signal using a broadcasting.

Figure 9:
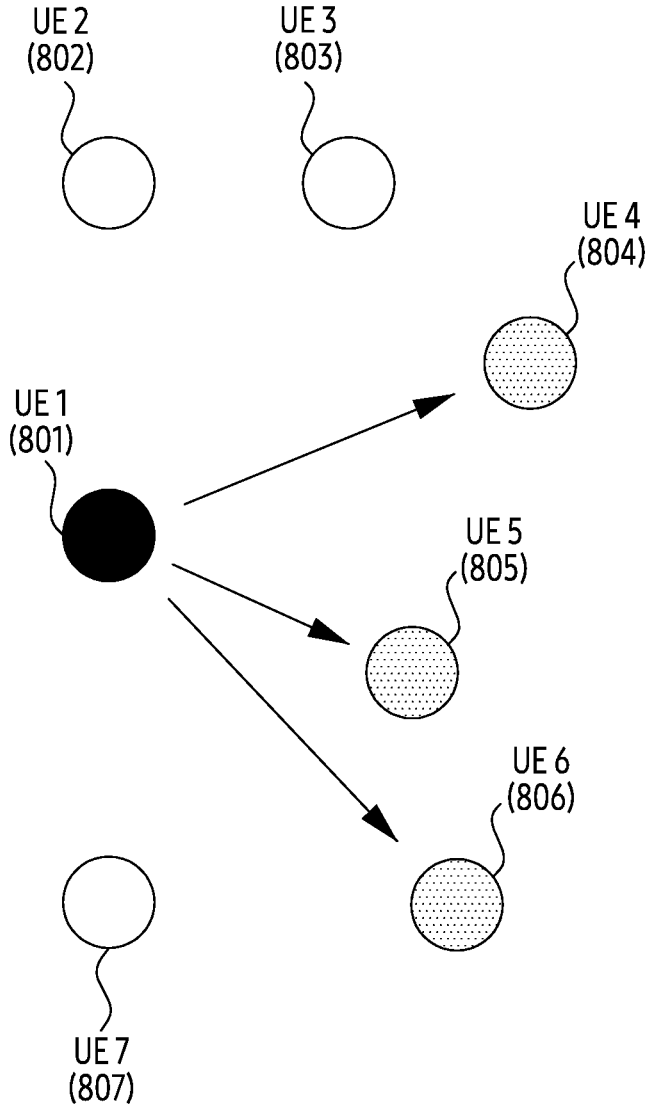
FIG. 9 illustrates an example in which a UE transmits a signal in a groupcast.

FIG. 9 illustrates an example in which a UE transmits a signal using a groupcasting.

Figure 10:
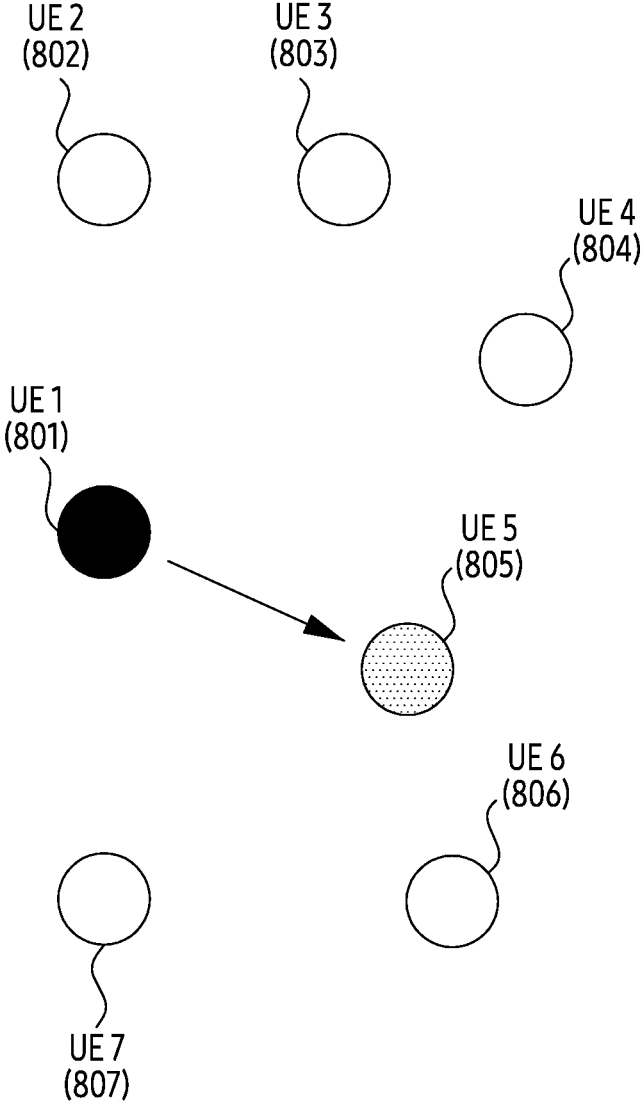
FIG. 10 illustrates an example in which a UE transmits a signal in a unicast.

FIG. 10 illustrates an example in which a UE transmits a signal using a unicasting.

Referring to FIG. 8, the UE 1 801 may transmit a signal through broadcast. Data and/or control information transmitted by the UE 1 801 through a sidelink may be received by all UEs (i.e., UE 2 802, UE 3 803, UE 4 804, UE 5 805, UE 6 806, and UE 7 807) distinguished from the UE 1 801. Accordingly, all UEs (i.e., UE 2 802, UE 3 803, UE 4 804, UE 5 805, UE 6 806, and UE 7 807) may receive data and/or control information transmitted by UE 1 801.

Referring to FIG. 9, the UE 1 801 may transmit a signal through groupcast. UEs (i.e., UE 4 804, UE 5 805, and UE 6 806) designated as a group may receive data and/or control information transmitted by UE 1 801 through the sidelink.

For example, when a plurality of groups are set, communication between different groups may not be performed. In other words, the UE 1 801 may perform sidelink communication only within the first group to which the UE 1 801 belongs, and may not perform sidelink communication with a UE belonging to the second group to which the UE 1 801 does not belong. However, the UE 1 801 may be included in the first group and the third group. When the UE 2 802 belongs to the second group and the third group, the UE 1 801 may perform sidelink communication with the UE 2 802 included in the third group.

According to an embodiment, the discovery process may not be performed in broadcast and groupcast. Accordingly, the UE 1 801 may perform sidelink communication without recognizing all adjacent UEs.

Referring to FIG. 10, the UE 1 801 may transmit a signal through unicast. The UE 1 801 may transmit a signal only to the UE 5 805. For example, the UE 1 801 may transmit a signal to the UE 5 805 through beamforming. For another example, the UE 1 801 may set a target terminal of a signal to the UE 5 805 and transmit a signal.

Hereinafter, an embodiment for performing a listen-before-talk (LBT) procedure within the licensed band may be described.

As illustrated in FIG. 4, a band in which sidelink communication is performed may be divided into the unlicensed band and the licensed band. However, since the unlicensed band and the licensed band are adjacent, interference caused by communication in the unlicensed band may occur even in the licensed band. Therefore, when continuous interference caused by the unlicensed band occurs, it may be required to perform the listen-before-talk (LBT) procedure even within the licensed band such as communication in the unlicensed band.

According to an embodiment, while performing the sidelink communication within the licensed band, the UE may determine to perform the LBT procedure, based on the quality of the sidelink communication. The licensed band in which the sidelink communication is performed may include a band adjacent to the unlicensed band. Accordingly, the quality of sidelink communication may be changed according to the degree of interference due to communication in the unlicensed band.

For example, the UE may determine to perform the LBT procedure based on the value related to the quality of the sidelink communication is less than or equal to a designated value. The value related to the quality of sidelink communication may be measured (or calculated) in various ways.

As an example, the value related to the quality of sidelink communication may include SL-RSSI. The UE may measure (or calculate/obtain) the SL-RSSI by measuring the strength of a received signal while performing sidelink communication.

As an example, the value related to the quality of sidelink communication may include sidelink reference signal received power (SL-RSRP). The UE may measure (or calculate/obtain) the SL-RSRP by calculating the average of the strength of a reference signal belonging to a designated cell of the entire frequency band while performing sidelink communication.

As another example, the value related to the quality of sidelink communication may include sidelink reference signal received quality (SL-RSRQ). The UE may measure (or calculate/obtain) the SL-RSRQ based on SL-RSSI and RSRP while performing sidelink communication. The SL-RSRQ may be set as in Equation 1 below.

$$SL-RSRQ = N\frac{SL-RSRP}{SL-RSSI} \qquad \text{[Equation 1]}$$

Referring to Equation 1, N may mean the number of resource blocks (RB used to calculate the SL-RSSI.

As another example, the value related to the quality of sidelink communication may include a Signal to Interference-plus-Noise Ratio (SINR) or a Channel Quality Indicator (CQI). Accordingly, the UE may identify a value related to the quality of sidelink communication by measuring the SINR or CQI.

For example, the UE may determine to perform the LBT procedure, based on whether a state in which the value related to the quality of sidelink communication is less than or equal to a designated value is maintained for a designated time interval. In other words, the UE may determine to perform the LBT procedure when the quality of the sidelink communication is maintained lower than the reference value for a designated time. Even when the UE identifies a state in which the value related to the quality of the sidelink communication is less than or equal to the designated value, the UE may maintain the existing communication when the value related to the quality of the sidelink communication is not maintained lower than the designated value for the designated time.

For example, the UE may be performing sidelink communication based on the LBT procedure. In this case, the UE may change the mode of the UE from the second mode for performing the LBT procedure to the first mode that does not perform the LBT procedure, based on the value relating to the quality of the sidelink communication being less than or equal to the first value or greater than or equal to the second value. In other words, when the quality of the sidelink communication is too low even when the UE performs the LBT procedure or the quality of the sidelink communication is high even when the LBT procedure is not maintained, the UE may change the mode of the UE to a first mode that does not perform the LBT procedure.

In the following specification, a random access procedure through the LBT procedure and the LBT procedure that may be performed in the licensed band may be described. First, various embodiments for the UE to perform channel access within the licensed band may be described.

According to the first embodiment, the UE may not use the listen-before-talk (LBT) procedure for channel access within the licensed band. For example, the UE may transmit a signal immediately after a switching gap within the channel occupancy time (COT).

For example, the UE may transmit the signal immediately after a short switching gap. The switching gap from reception to transmission may be set to accommodate the required time of the transceiver. The switching gap may be set to 16 us (microseconds) or less.

According to the second embodiment, the UE may perform channel access within the licensed band using the LBT procedure without random backoff. The UE may transmit a signal based on the channel being idle state within a designated interval. The UE may transmit a signal in a state (or condition) that the channel is idle state within the designated interval.

According to the third embodiment, in order to perform channel access within the licensed band, the UE may perform the LBT procedure together with the random backoff in which a contention window of a fixed size is set. For example, for the LBT procedure, the UE may set arbitrary value N within the contention window. The arbitrary value N may be set within the minimum value and maximum value of the contention window. The size of the contention window may mean a difference between a minimum value and a maximum value. Accordingly, the difference between the minimum value and the maximum value of the contention window may be fixed. The arbitrary value N may be used to determine the time at which the channel detects the idle state before the UE transmits a signal.

According to the fourth embodiment, in order to perform channel access within the licensed band, the UE may perform the LBT procedure together with a random backoff in which a contention window of a variable size is set. For example, for the LBT procedure, the UE may set arbitrary value N within the contention window. The arbitrary value N may be set within the minimum value and maximum value of the contention window. The size of the contention window may mean a difference between a minimum value and a maximum value. The size of the contention window may be changed. As an example, the UE may change the size of the contention window when setting the arbitrary value N. The arbitrary value N may be used to determine the time at which the channel detects an idle state before the UE transmits a signal.

A detailed operation of the UE according to the fourth embodiment may be described below. In other words, a channel access procedure using a contention window of a variable size may be described in detail. In other words, detailed operations for the LBT procedure may be described below.

According to an embodiment, traffic to be transmitted on the licensed band may be generated in the UE. The UE may identify a priority class of the traffic. A different priority class may be assigned to each type of traffic (or packet). Since the different priority classes are assigned to each type of traffic, there is an effect that latency may transmit important traffic first. According to the priority class, parameters required for random backoff may be set as shown in Table 3.

TABLE 3

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Referring to Table 3, according to the priority class (p), the number ($m_p$) of defer slot, the minimum contention window (CW) size ($CW_{min,p}$), the maximum CW size ($CW_{max,p}$), the maximum channel occupancy time ($T_{mcot,p}$), and the allowed CW size may be set.

For example, when the priority class is in the first value (e.g., 1), the number of defer slots may be set to 1. The minimum CW size may be set to 3 us. The size of the maximum CW may be set to 7 us. The maximum channel occupancy time may be set to 2 ms. The size of the allowed CW may be set to either 3 us or 7 us.

First, the UE may set a delay interval based on the priority class of the traffic. For example, the UE may measure the channel state in the delay interval. The UE may determine whether the channel state is an idle state. The delay interval may be calculated based on the number of defer slots, and the delay interval ($T_d$) may be set as in Equation 2 below.

$$T_d = T_f + T_{sl} \times m_p \qquad \text{[Equation 2]}$$

Referring to Equation 2, $T_d$ may mean a delay interval. $T_f$ may be set to 16 us. $T_{sl}$ may mean a sensing slot interval. $m_p$ may mean the number of defer slots. For example, $T_{sl}$ may be set to 9 us.

Meanwhile, the UE may set (or determine) a CW between the size of the minimum CW and the size of the maximum CW based on the priority class. In other words, the CW may be set to satisfy Equation 3 below.

$$CW_{min,p} \le CW \le CW_{max,p} \qquad \text{[Equation 3]}$$

Referring to Equation 3, $CW_{min,p}$ may mean the size of a minimum contention window (CW). CW in Equation 3 may mean the size of the set CW. $CW_{max,p}$ may mean the size of the maximum CW.

The UE may set the value of the backoff counter between 0 and the set CW. In other words, the value N of the backoff counter may be set to satisfy Equation 4 below.

$$0 \le N \le CW \qquad \text{[Equation 4]}$$

Referring to Equation 4, N may mean the value of the backoff counter. CW in Equation 4 may mean the size of the set CW.

When the channel state is idle state during the sensing slot, the UE may decrease the value of the backoff counter by 1. When the channel state is busy state during the sensing slot, the UE may maintain the value of the backoff counter without decreasing. Again, when the channel state is changed to the idle state, the UE may decrease the value of the backoff counter. Based on that the value of the backoff counter is set to 0, the UE may transmit traffic. When the transmitted data is not properly transmitted due to interference or collision, the UE may increase the size of the maximum CW and transmit the data again through the backoff procedure.

Based on the above-described LBT procedure, an example in which random access is performed in sidelink communication on the licensed band may be described with reference to FIGS. 11 and 12.

Figure 11:
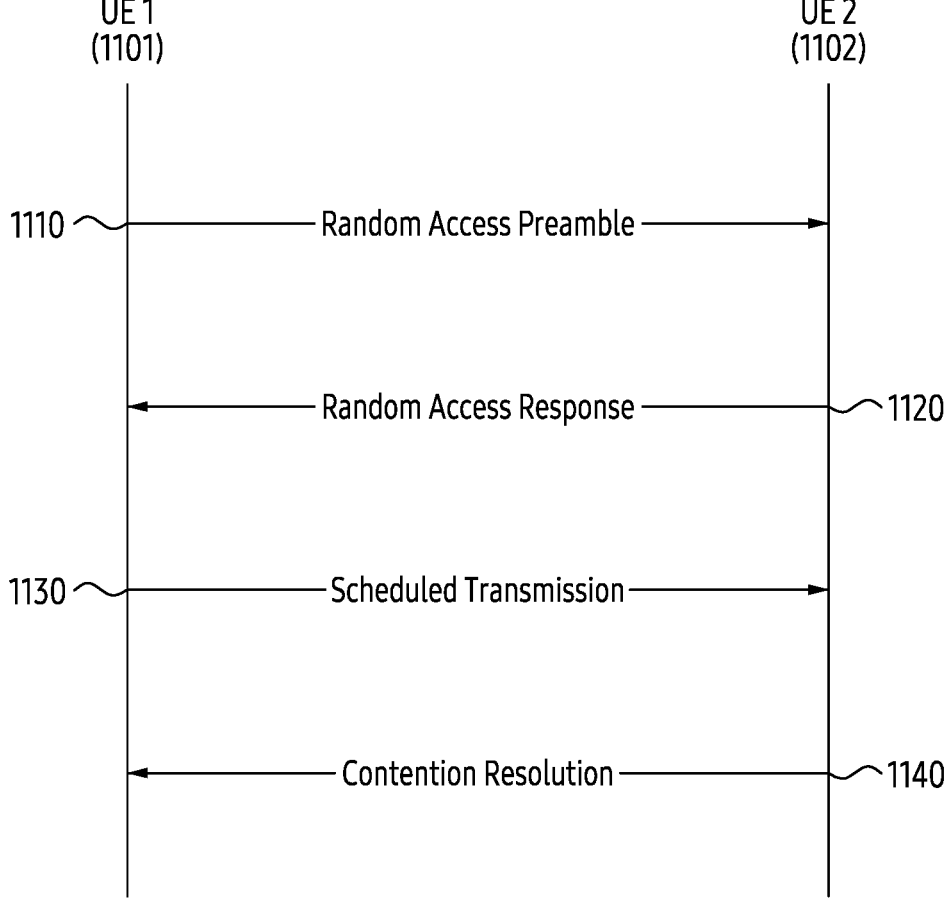
FIG. 11 illustrates a random access procedure of 4 step.

FIG. 11 illustrates a random access procedure of 4 step.

Referring to FIG. 11, the UE 1 1101 may perform a random access procedure to establish a sidelink connection with the UE 2 1102 within the licensed band. For example, the UE 1 1101 may perform a 4-step random access procedure in various cases requiring initial access, reconnection, or random access.

In step 1110, the UE 1 1101 may transmit a first message including a random access preamble through a physical random access channel (PRACH) in the licensed band. The PRACH resource or preamble may be configured through system information block 1 (SIB1) or RRC-dedicated signaling. A plurality of preambles may be transmitted through one PRACH (or PRACH resource). The UE 1 1101 may select a PRACH occasion. Thereafter, the UE 1 1101 may transmit a first message including a random access preamble based on the selected PRACH occasion.

For example, the first message may be transmitted based on the LBT procedure. Accordingly, the UE 1 1101 may first identify the channel situation and transmit the first message through the backoff procedure.

In step 1120, the UE 2 1102 may transmit a second message related to the random access response (RAR) to the UE 1 1101. The UE1 1101 may receive a second message regarding the random access response from the UE 2 1102.

For example, the second message may include information on resource scheduling. For example, in step 1110, a plurality of UEs may transmit different preamble. The UE 2 1102 may distinguish each preamble based on a time/frequency resource and a preamble index in which different preambles are transmitted. In this case, the second message may include responses to each frame.

For example, the second message may be transmitted based on the LBT procedure. Accordingly, the UE 2 1102 may first identify the channel situation and transmit the second message through the backoff procedure.

In step 1130, the UE 1 1101 may transmit a third message scheduled to the UE 2 1102. The UE 2 1102 may receive the scheduled third message from the UE 1 1101.

For example, the third message may include at least one of information on an RRC connection request, information on updating a tracking area, and information on a scheduling request.

For example, the third message may be transmitted based on the LBT procedure. Accordingly, the UE 1 1101 may first identify the channel situation and transmit the third message through the backoff procedure.

In step 1140, the UE 2 1102 may transmit a fourth message to the UE 1 1101. The UE 1 1101 may receive the fourth message from the UE 2 1102. For example, the fourth message may include contention resolution information. The fourth message may further include information related to the ID of the UE 1 1101 and/or RRC connection.

For example, the fourth message may be transmitted based on the LBT procedure. Accordingly, the UE 2 1102 may first identify the channel situation and transmit the fourth message through the backoff procedure.

Although not shown, when the UE 1 1101 does not receive the fourth message for a designated time, it may identify that contention is not resolved. Accordingly, the UE 1 1101 may retransmit the third message.

The UE 1 1101 and the UE 2 1102 may establish the sidelink connection within the licensed band based on the exchange of the first message to fourth message.

Figure 12:
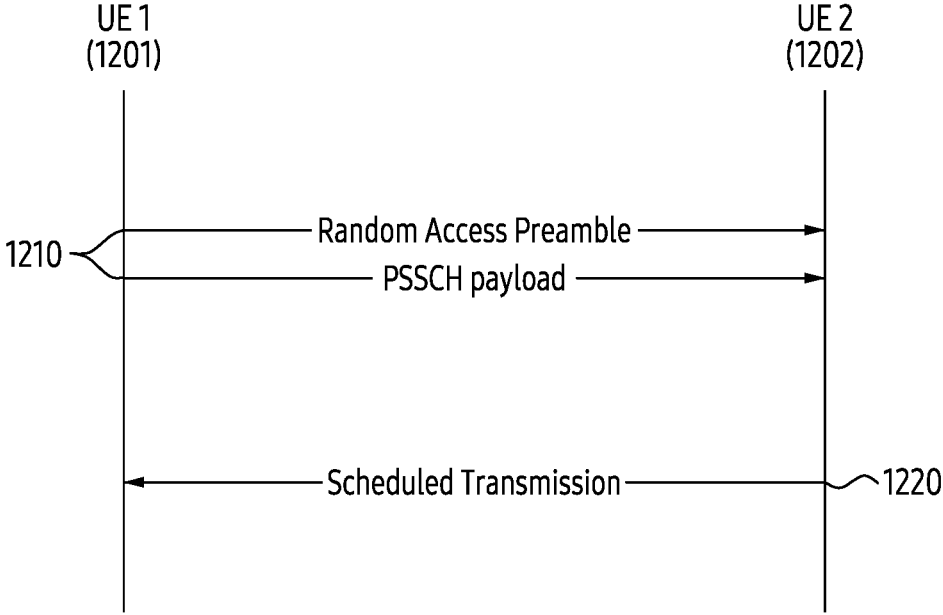
FIG. 12 illustrates a random access procedure of 2 step.

FIG. 12 illustrates a random access procedure of 2 step.

Referring to FIG. 12, the UE 1 1201 may perform a random access procedure to establish a sidelink connection with the UE 2 1202 within the licensed band. For example, the UE 1 1201 may perform a 2-step random access procedure in various cases requiring initial access, reconnection, or random access. According to the 2-step random access procedure, latency and/or signaling overhead are reduced compared to the 4-step random access procedure shown in FIG.

In step 1210, the UE 1 1201 may transmit a message A including a random access preamble to the UE 2 1202 through the PRACH in the licensed band. In addition, the UE 1 1201 may transmit the payload through the PSSCH. In the message A, the PRACH preamble and the PSSCH may be time division multiplexed (TDM).

For example, the message A may include various information. As an example, the message A may include information on the maximum number of transmissions of the preamble. When the maximum number of transmissions of the preamble exceeds, the UE 1 1201 may terminate the 2-step random access procedure and may fall back to the 4-step random access procedure.

For example, the message A may be transmitted based on the LBT procedure. Accordingly, the UE 1 1201 may first identify the channel situation and transmit the message A through the backoff procedure.

In step 1220, the UE 2 1202 may transmit a message B to the UE 1 1201. For example, the message B may include contention resolution information. The message B may further include information related to the ID of the UE 1 1201 and/or RRC connection.

For example, the message B may be transmitted based on the LBT procedure. Accordingly, the UE 2 1202 may first identify the channel situation and transmit the message B through the backoff procedure.

For example, the UE 1 1201 may transmit a preamble and set a response window. When the UE 1 1201 does not receive the message B until the value of the response window reaches 0, the UE 1 1201 may repeat the random access procedure again. When the designated number of repetitions is exceeded, the UE 1 1201 may terminate the 2-step random access procedure and may fall back to the 4-step random access procedure.

In the following specification, an embodiment for determining whether to perform the LBT procedure based on the quality of the sidelink communication in the first user equipment may be described. The first user equipment may be related to the electronic device (or UE) of various embodiments described above or UE 1 (210, 500, 600, 700, 801, 1101, and 1201).

Figure 13:
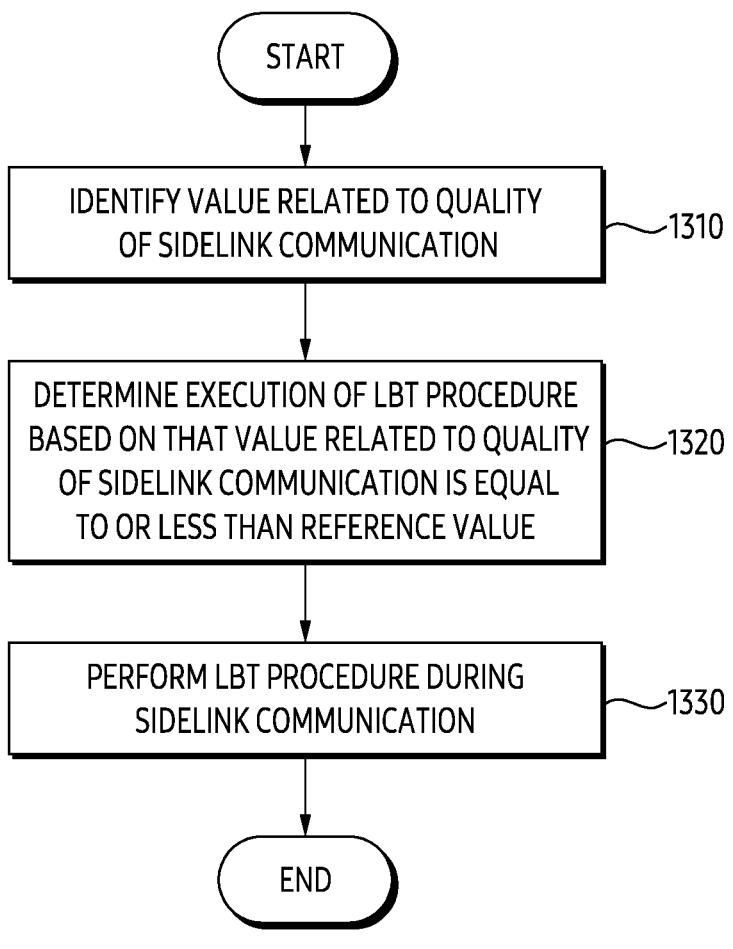
FIG. 13 illustrates an example of an operation of the first user equipment.

FIG. 13 illustrates an example of an operation of the first user equipment.

Referring to FIG. 13, in operation 1310, the first user equipment (e.g., the processor of the first user equipment) may identify a value related to the quality of the sidelink communication.

According to an embodiment, the first user equipment may perform sidelink communication with the second user equipment on the licensed band. For example, the first user equipment and the second user equipment may be located within the base station. As another example, one of the first user equipment and the second user equipment may be located outside the base station. As still another example, both the first user equipment and the second user equipment may be located outside the base station.

In a state that the first user equipment is within the base station, the first user equipment may be allocated a resource for sidelink communication from the base station. The first user equipment may select a resource to perform sidelink communication within the allocated resource. The first user equipment may perform sidelink communication with the second user equipment through the selected resource.

In a state that the first user equipment is outside the base station, the first user equipment may allocate (or select) resources to perform sidelink communication by itself. The first user equipment may perform sidelink communication with the second user equipment through the allocated resource. The first user equipment may allocate (or select) resources for performing sidelink communication by itself, even when the first user equipment is within the base station.

According to an embodiment, the first user equipment may perform sidelink communication with the second user equipment on the licensed band adjacent to the unlicensed band. In the unlicensed band, not only cellular communication but also wireless local area network (WLAN) may coexist. Accordingly, interference by communication of the unlicensed band may occur in the licensed band adjacent to the unlicensed band. The first user equipment may identify that the quality of the sidelink communication in the licensed band decreases due to interference by communication in the unlicensed band.

The first user equipment may identify a value related to the quality of the sidelink communication. The value related to the quality of the sidelink communication may be variously set. For example, the value related to the quality of the sidelink communication may include at least one of SL-RSSI, SL-RSRP, SL-RSRQ, SINR, or CQI, or a combination thereof.

For example, the first user equipment may identify the SL-RSRQ as the value related to the quality of the sidelink communication. The first user equipment may identify the SL-RSSI and the SL-RSRP. The first user equipment may identify (or calculate) the SL-RSRQ based on the SL-RSSI and the SL-RSRP. In other words, the value related to the quality of the sidelink communication may be determined based on the SL-RSRQ.

As another example, the first user equipment may identify a product (or sum) of SL-RSRQ and SINR as the value related to the quality of the sidelink communication. In other words, the first user equipment may identify a value related to the quality of the sidelink communication by calculating the product (or sum) of the SL-RSRQ and the SINR.

In operation 1320, the first user equipment may determine the execution of the LBT procedure in a state that a value related to the quality of the sidelink communication is equal to or less than a reference value.

For example, the first user equipment may determine whether the value related to the quality of the sidelink communication is less than or equal to the reference value. In order to determine whether the sidelink communication is smoothly performed, the first user equipment may determine whether the value related to the quality of the sidelink communication is equal to or less than the reference value.

For example, the first user equipment may operate in two communication modes within the licensed band. The first user equipment may operate in one of a first mode for not performing the LBT procedure and a second mode for performing the LBT procedure.

In the first mode, the first user equipment may not perform the LBT procedure when transmitting a signal. For example, in the first mode, the first user equipment may transmit a signal without performing a channel access procedure.

In the second mode, the first user equipment may perform the LBT procedure when transmitting a signal. For example, in the second mode, the first user equipment may transmit a signal after performing the channel access procedure.

According to an embodiment, when a value related to the quality of the sidelink communication exceeds a reference value, the first user equipment may maintain an existing communication method. In other words, when a value related to the quality of the sidelink communication exceeds a reference value, the first user equipment operating in the first mode may maintain the first mode.

According to an embodiment, when the value related to the quality of the sidelink communication is less than or equal to the reference value, the first user equipment may determine the execution of the LBT procedure. In other words, when the value related to the quality of the sidelink communication is equal to or less than the reference value, the first user equipment operating in the first mode may determine to change the mode of the first user equipment from the first mode to the second mode.

In operation 1330, the first user equipment may perform the LBT procedure during sidelink communication on the licensed band.

According to an embodiment, the first user equipment may perform the LBT procedure during sidelink communication on the licensed band based on the value related to the quality of the sidelink communication being less than or equal to the reference value. For example, the first user equipment may perform the LBT procedure when transmitting a signal. In other words, the first user equipment may operate in the second mode. For example, the first user equipment may transmit a signal after performing the channel access procedure.

According to an embodiment, the first user equipment may identify data (or traffic) to be transmitted to the second user equipment. The first user equipment may identify the priority of the data. The first user equipment may identify a size of a minimum contention window and a size of a maximum contention window based on the priority of the data.

The first user equipment may determine the size of the contention window between the size of the minimum contention window and the size of the maximum contention window. In other words, the size of the determined contention window may be set to be smaller (or equal to or smaller than) the maximum contention window. In addition, the size of the determined contention window may be set to be larger (or equal to or larger than) the minimum contention window.

The first user equipment may set the backoff counter within the determined contention window. For example, the first user equipment may set the backoff counter as an arbitrary value between 0 and the determined contention windows.

The first user equipment may reduce the backoff counter within a plurality of slot intervals.

For example, the first user equipment may reduce a value of the backoff counter in a state that a channel state is idle state within the plurality of slot intervals. In other words, the first user equipment may reduce the value of the backoff counter based on the channel state being the idle state within the plurality of slot intervals. For example, the first user equipment may reduce the value of the backoff counter by 1 whenever one slot has elapsed.

For another example, the first user equipment may maintain the value of the backoff counter in a state that a channel state is busy state within the plurality of slot intervals. In other words, the first user equipment may maintain the value of the backoff counter without reducing the value of the backoff counter based on the channel state being the busy state in the plurality of slot intervals.

The first user equipment may determine the channel occupancy time based on the value of the backoff counter being the first value (e.g., 0). The first user equipment may transmit data (or traffic) to the second user equipment on the licensed band within the channel occupancy time.

According to an embodiment, after transmitting data to the second user equipment through the above-described the LBT procedure, the first user equipment may determine whether the data is properly transmitted to the second user equipment. When the data is properly transmitted to the second user equipment, the first user equipment may receive a response signal for the data from the second user equipment.

When the data is not properly transmitted to the second user equipment, the first user equipment may not receive the response signal for the data from the second user equipment. Accordingly, the first user equipment may identify that the data is not properly transmitted based on that the response signal for the data is not received. In other words, in a state that the response signal for the data is not received, the first user equipment may identify that the data is not properly transmitted. For example, the data may not be transmitted to the second user equipment due to a collision or interference caused by communication in the unlicensed band.

The first user equipment may increase the size of the contention window based on the data not being transmitted. The size of the contention window may be set smaller than the maximum size of the contention window. The maximum size of the contention window may be set to prevent the contention window from continuously increasing due to repeated collisions or interference.

After increasing the contention window size, the first user equipment may retransmit the data to the second user equipment through sidelink communication on the licensed band by performing the channel access procedure again.

Figure 14:
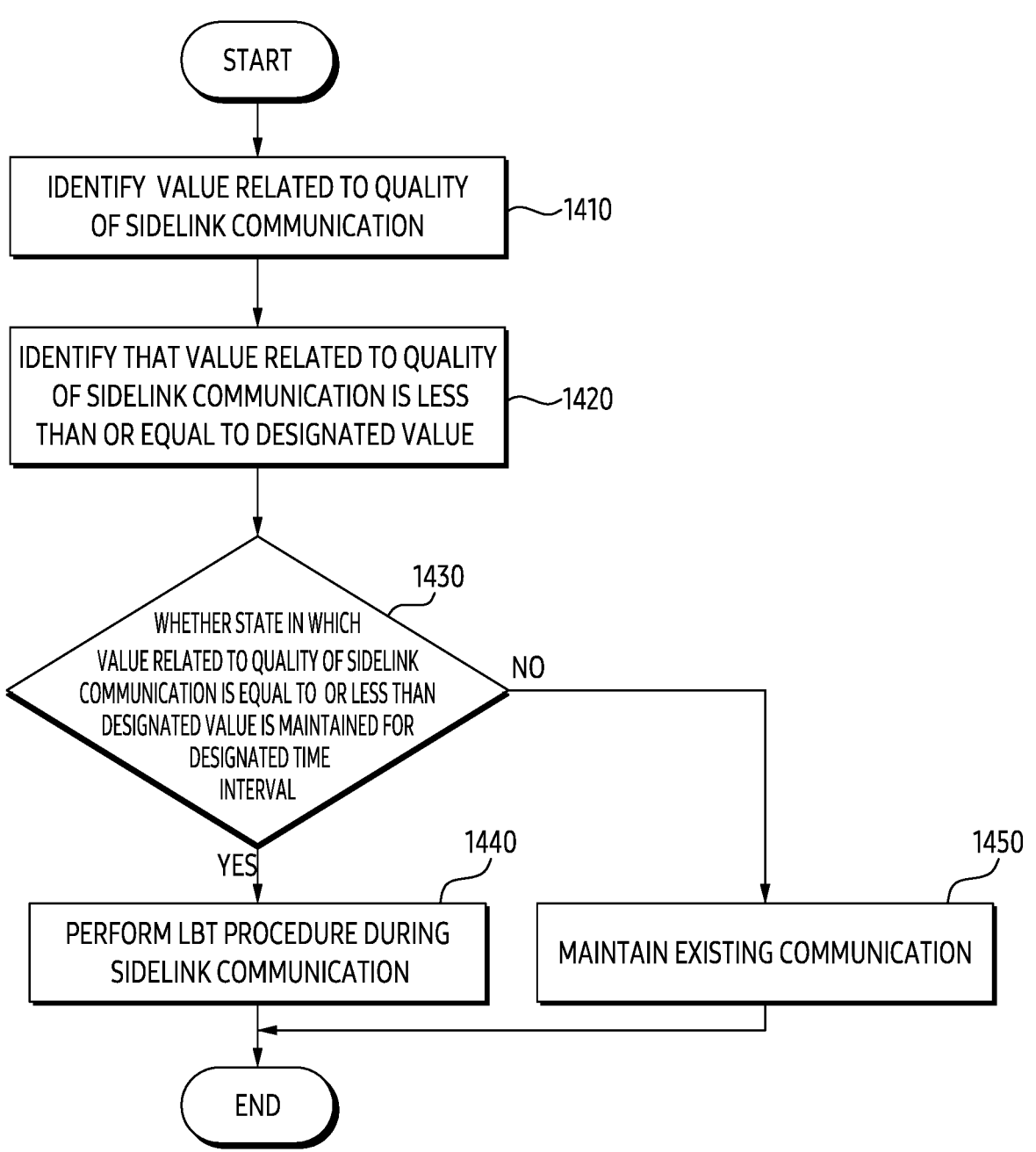
FIG. 14 illustrates another example of an operation of the first user equipment.

Although FIG. 13 illustrates an embodiment of immediately performing the LBT procedure when the value related to the quality of the sidelink communication is equal to or less than a designated value, in FIG. 14, an embodiment of performing the LBT procedure is illustrated only when the value related to the quality of the sidelink communication is maintained for a designated time interval even when the value is equal to or less than a designated value.

FIG. 14 illustrates another example of an operation of the first user equipment.

Referring to FIG. 14, in operation 1410, the first user equipment (e.g., the processor of the first user equipment) may identify a value related to the quality of the sidelink communication. Operation 1410 may be related to operation 1310 of FIG. 13.

In operation 1420, the first user equipment may identify that the value related to the quality of sidelink communication is less than or equal to a designated value.

In operation 1430, the first user equipment may determine whether a state in which a value related to the quality of sidelink communication is equal to or less than a designated value is maintained for a designated time interval. For example, after identifying that the value related to the quality of sidelink communication is less than or equal to the designated value, the first user equipment may identify the value related to the quality of the sidelink communication for the designated time interval. The first user equipment may determine whether the value related to the quality of the sidelink communication is maintained for the designated time interval.

In operation 1440, when a state in which the value related to quality of the sidelink communication is equal to or less than the designated value is maintained for the designated time interval, the first user equipment may perform the LBT procedure during sidelink communication on the licensed band. In other words, when the quality of the sidelink communication is maintained below the reference value for the designated time, the first user equipment may determine to perform the LBT procedure and perform the LBT procedure. In other words, the first user equipment may change the mode of the first user equipment to the second mode for performing the LBT procedure.

In operation 1450, when a state in which the value related to the quality of sidelink communication is equal to or less than the designated value is not maintained for the designated time interval, the first user equipment may maintain the existing communication method. Even when the value related to the quality of the sidelink communication is identified below the designated value, the first user equipment may maintain the existing communication if the value related to the quality of the sidelink communication is not maintained lower than the designated value for the designated time. In other words, the first user equipment may maintain the mode of the first user equipment in a first mode in which the LBT procedure is not performed.

Figure 15:
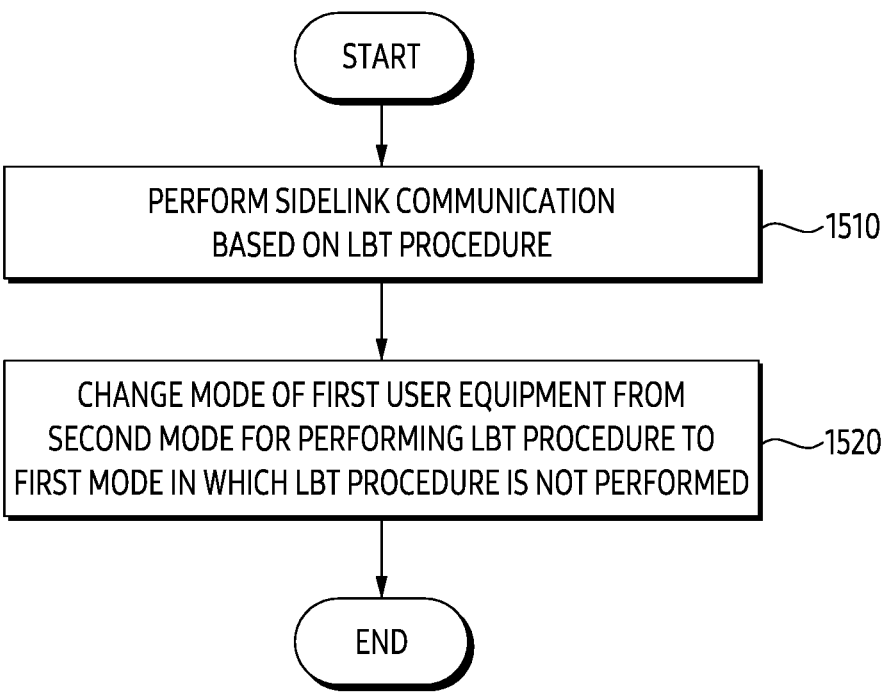
FIG. 15 illustrates still another example of an operation of the first user equipment.

FIG. 15 illustrates still another example of an operation of the first user equipment.

Referring to FIG. 15, in operation 1510, the first user equipment (e.g., a processor of the first user equipment) may perform sidelink communication with the second user equipment within the licensed band based on the LBT procedure. The first user equipment may perform operations 1310 to 1330 of FIG. 13 or operations 1410 to 1440 of FIG. 14, and may perform sidelink communication with the second user equipment based on the LBT procedure.

In operation 1520, based on the value related to the quality of the sidelink communication being equal to or less than the first value or equal to or greater than the second value, the first user equipment may change the mode of the first user equipment from the second mode for performing the LBT procedure to the first mode in which the LBT procedure is not performed.

For example, the first value may be less than the second value. When the quality of sidelink communication is too low even after performing the LBT procedure or the quality of the sidelink communication is high even when the LBT procedure is not maintained, the first user equipment may change the mode of the first user equipment to the first mode that does not perform the LBT procedure.

Figure 16:
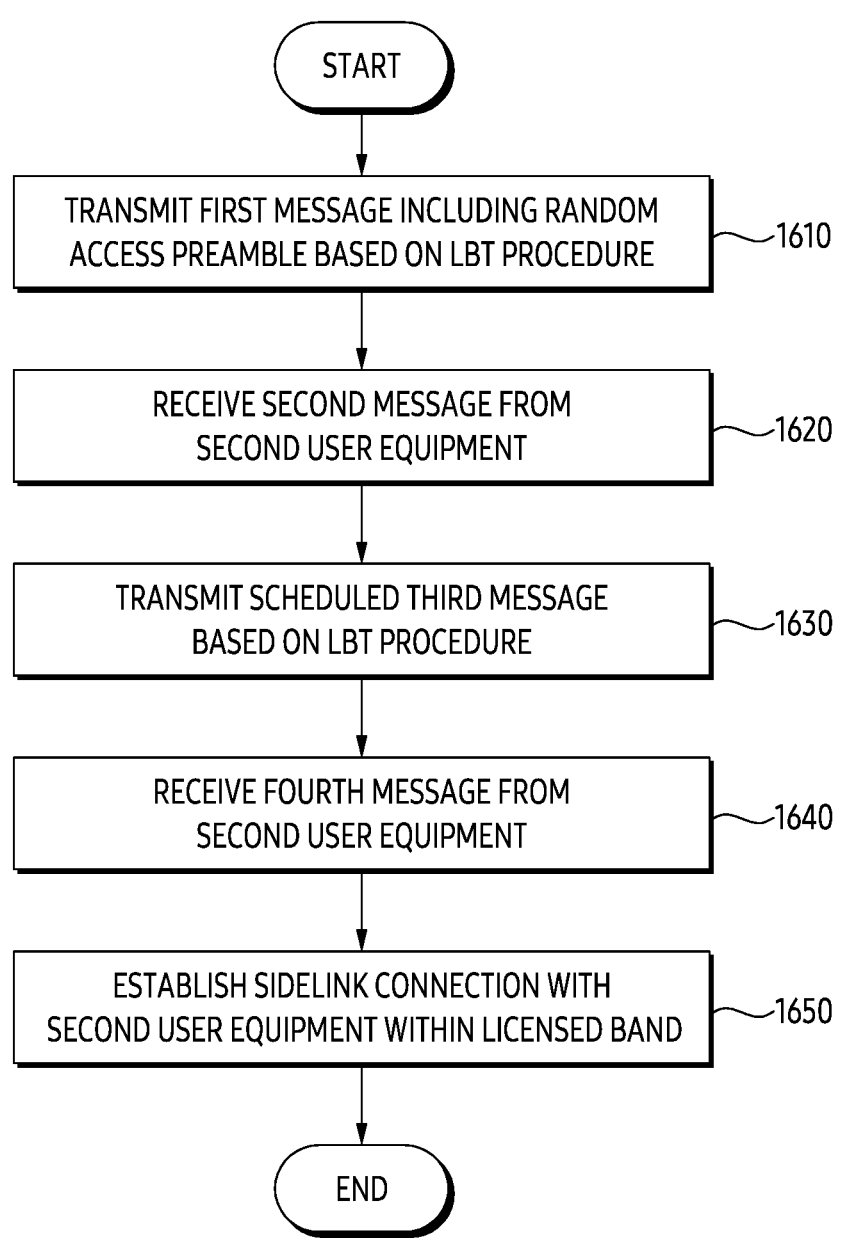
FIG. 16 illustrates still another example of an operation of the first user equipment.

FIG. 16 illustrates still another example of an operation of the first user equipment.

Referring to FIG. 16, operation 1610 to operation 1650 may be performed before performing operations of the first user equipment of FIG. 13 to FIG. 15.

In operation 1610, the first user equipment (e.g., the processor of the first user equipment) may transmit the first message including the random access preamble based on the LBT procedure.

According to an embodiment, in order to perform sidelink communication with the second user equipment, the first user equipment may transmit the first message including the random access preamble based on the LBT procedure, through physical random access channel (PRACH). A plurality of preambles may be transmitted through one PRACH (or PRACH resource). The first user equipment may select a PRACH occasion. Thereafter, the first message including the random access preamble may be transmitted based on the selected PRACH occasion.

For example, the first message may be transmitted based on the LBT procedure. Accordingly, the first user equipment may first identify the channel situation and transmit the first message through the backoff procedure.

In operation 1620, the first user equipment may receive a second message from the second user equipment.

For example, the first user equipment may receive the second message related to a random access response (RAR) from the second user equipment. The second message may include information on resource scheduling.

For example, the second message may be transmitted based on the LBT procedure. Accordingly, the second user equipment may first identify the channel situation and transmit the second message through the backoff procedure.

In operation 1630, the first user equipment may transmit the scheduled third message based on the LBT procedure.

According to an embodiment, in response to the second message, the first user equipment may transmit the scheduled third message based on the LBT procedure.

For example, the third message may include at least one of information on an RRC connection request, information on updating a tracking area, and information on a scheduling request.

For example, the third message may be transmitted based on the LBT procedure. Accordingly, the first user equipment may first identify the channel situation and transmit the third message through the backoff procedure.

In operation 1640, the first user equipment may receive a fourth message from the second user equipment.

For example, the fourth message may include contention resolution information. The fourth message may further include information related to the ID of the first user equipment and/or RRC connection.

For example, the fourth message may be transmitted based on the LBT procedure. Accordingly, the second user equipment may first identify the channel situation and transmit the fourth message through the backoff procedure.

In operation 1650, the first user equipment may establish a sidelink connection with the second user equipment within the licensed band.

According to an embodiment, the first user equipment may establish the sidelink connection with the second user equipment within the licensed band based on the fourth message.

According to an embodiment, when the first user equipment does not receive the fourth message for a designated time, it may determine that contention is not resolved. In this case, the first user equipment may retransmit the third message.

Figure 17:
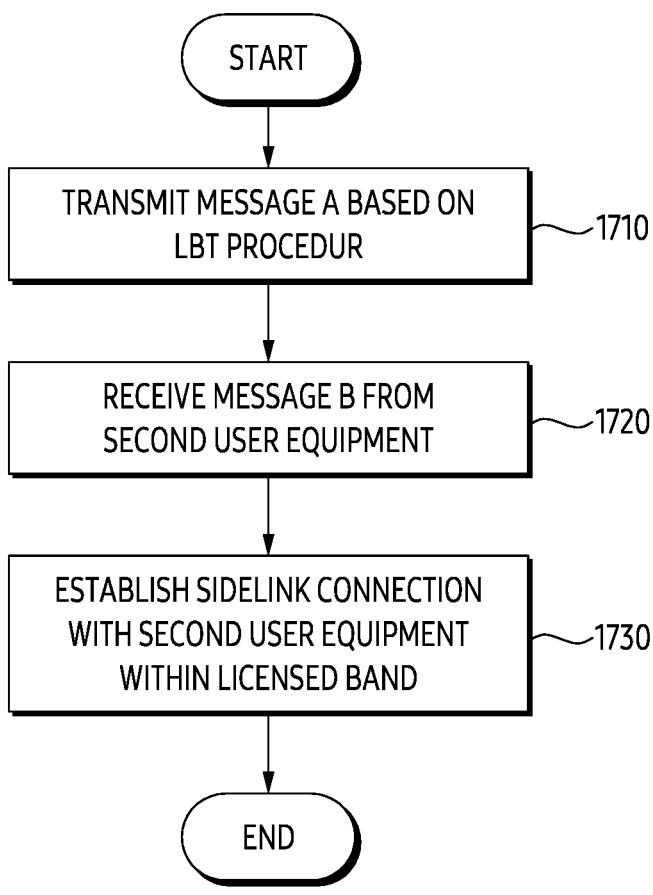
FIG. 17 illustrates still another example of an operation of the first user equipment.

FIG. 17 illustrates still another example of an operation of the first user equipment.

Referring to FIG. 17, operation 1710 to operation 1730 may be performed before performing operations of the first user equipment of FIG. 13 to FIG. 15.

In operation 1710, the first user equipment (e.g., the processor of the first user equipment) may transmit the message A based on the LBT procedure.

According to an embodiment, the first user equipment may transmit the message A based on the LBT procedure to perform sidelink communication with the second user equipment.

For example, the message A may include a random access preamble and information for performing a collision resolution procedure.

For example, the message A may further include various information. For example, the message A may include information on the maximum number of transmissions of the preamble.

For example, the message A may be transmitted based on the LBT procedure. Accordingly, the first user equipment may first identify the channel situation and transmit the message A through the backoff procedure.

In operation 1720, the first user equipment may receive the message B from the second user equipment.

According to an embodiment, the first user equipment may receive the message B based on the message A. For example, the message B may include information on resource scheduling and collision resolution information. For example, the message B may further include various information. For example, the message B may further include information related to the ID of the first user equipment and/or RRC connection.

In operation 1730, the first user equipment may establish a sidelink connection with the second user equipment within the licensed band. According to an embodiment, the first user equipment may establish a sidelink connection with the second user equipment within the licensed band based on the message B.

Figure 18:
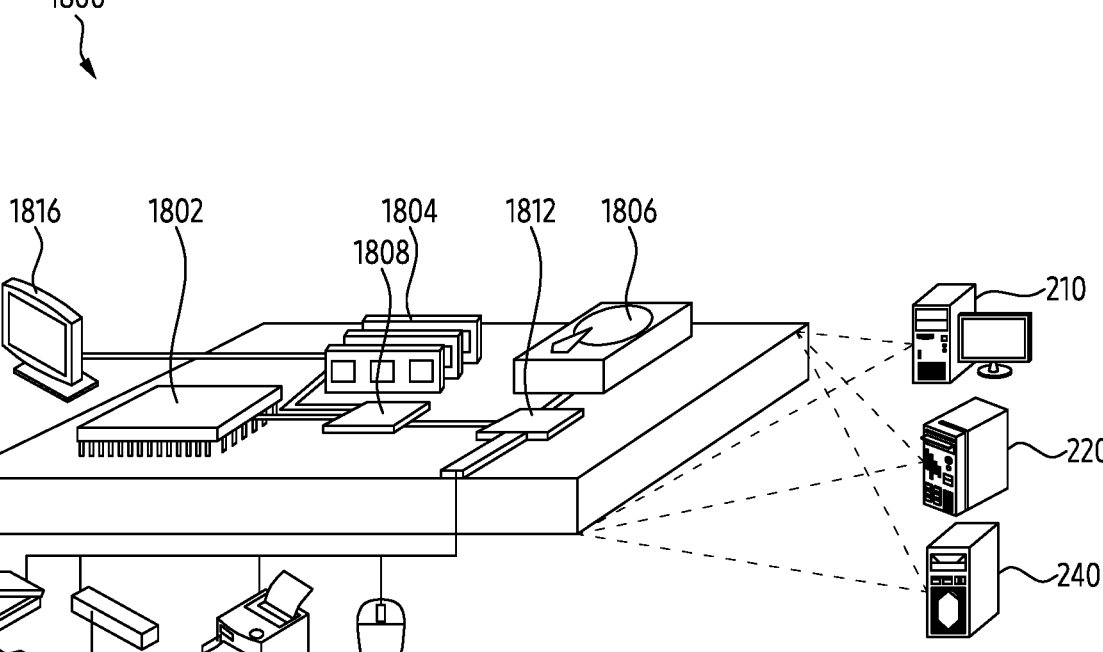
FIG. 18 is a simplified block diagram of a user equipment according to various embodiments.

FIG. 18 is a simplified block diagram of electronic devices according to various embodiments.

Referring to FIG. 18, the electronic device 1800 may be an example of the electronic device 210, the electronic device 220, or the electronic device 240. The electronic device 1800 may comprise a processor 1802, a memory 1804, a storage device 1806, high-speed controller 1808 (e.g., northbridge, MCH (Main Controller Hub) and low-speed controller 1812 (e.g., southbridge, ICH (I/O controller hub)). In the electronic device 1800, each of the processor 1802, the memory 1804, the storage device 1806, the fast controller 1808, and the slow controller 1812 may be interconnected using various buses.

For example, the processor 1802 may process instructions for execution in the electronic device 1800 in order to display graphic information on a graphical user interface (GUI) on an external input/output device such as display 1816 connected to high-speed controller 1808. The instructions may be comprised in the memory 1804 or the storage device 1806. The instructions may cause the electronic device 1800 to perform one or more of the above-described operations when executed by processor 1802. According to embodiments, the processor 1802 may be composed of a plurality of processors including a communication processor and a GPU (graphical processing unit).

For example, the memory 1804 may store information in the electronic device 1800. For example, the memory 1804 may be a volatile memory unit or units. As another example, the memory 1804 may be a nonvolatile memory unit or units. For another example, memory 1804 may be another type of computer-readable medium, such as a magnetic or optical disk.

For example, the storage device 1806 may provide a mass storage space to the electronic device 1800. For example, storage device 1806 may be a computer-readable medium such as a hard disk device, an optical disk device, flash memory, solid state memory devices, or an array of devices in a storage area network (SAN).

For example, the high-speed controller 1808 may manage bandwidth-intensive operations for electronic device 1800, while low-speed controller 1812 may manage low bandwidth-intensive operations for electronic device 1800. For example, the high-speed controller 1808 may be coupled to the memory 1804 and coupled to the display 1816 through a GPU or accelerator, while the low speed controller 1812 may be coupled to the storage device 1806 and coupled to various communication ports (e.g., universal serial bus (USB), Bluetooth, Ethernet, wireless Ethernet) for communication with an external electronic device (e.g., keyboard, transducer, scanner, or network device (e.g., switch or router)).

According to various embodiments, a first user equipment (UE) may comprise a transceiver to transmit and receive a wireless signal; and a processor connected with the transceiver, wherein the processor may be configured to identify a value related to quality of sidelink communication while the first UE performs sidelink communication on licensed band with a second UE, determine to perform a listen before talk (LBT) procedure on a condition that the value related to the quality of the sidelink communication is less than or equal to a reference value, and perform the LBT procedure during performing the sidelink communication on the licensed band.

According to an embodiment, the processor may be configured to set, based on the LBT procedure, a backoff counter within a contention window, decrease the backoff counter within a plurality of slot intervals, determine, based on a value of the backoff counter being a first value, channel occupancy time, and transmit data to the second UE on the licensed band within the channel occupancy time.

According to an embodiment, the processor may be further configured to decrease the value of the backoff counter on a condition that a channel state is an idle state within the plurality of slot intervals.

According to an embodiment, the processor may be further configured to maintain the value of the backoff counter on a condition that the channel state is a busy state within the plurality of slot intervals.

According to an embodiment, the processor may be further configured to identify that the data does not transmit to the second UE, and increase size of the contention window.

According to an embodiment, the size of the contention window may be set less than maximum size of the contention window.

According to an embodiment, a value related to quality of the sidelink communication may be set based on sidelink-reference signal received quality (SL-RSRQ).

According to an embodiment, the licensed band may include a band adjacent to unlicensed band.

According to an embodiment, the value related to the quality of the sidelink communication may be determined based on interference caused by communication in the unlicensed band.

According to an embodiment, the processor may be configured to transmit, based on the LBT procedure, a first message including a random access preamble through a physical random access channel (PRACH) in order to performing the sidelink communication with the second UE, receive a second message from the second UE, wherein the second message includes information on resource scheduling, in response to the second message, transmit a scheduled third message based on the LBT procedure, based on the third message, receive a fourth message including contention resolution information from the second UE, and based on the fourth message, establish a connection of the sidelink communication with the second UE on the licensed band.

According to an embodiment, the processor may be configured to transmit, based on the LBT procedure, a message A including a random access preamble and information for performing a collision resolution procedure, to perform the sidelink communication with the second UE, receive, based on the message A, a message B including information on resource scheduling and collision resolution information from the second UE, and establish, based on the message B, a connection of sidelink communication with the second UE on the licensed band.

According to various embodiments, a method for operating a first user equipment (UE) may comprise identifying a value related to quality of sidelink communication while the first UE performs sidelink communication on licensed band with a second UE, determining to perform a listen before talk (LBT) procedure on a condition that the value related to the quality of the sidelink communication is less than or equal to a reference value, and performing the LBT procedure during performing the sidelink communication on the licensed band.

According to an embodiment, the method may comprise identifying priority of the data, identifying whether the priority of the data is greater than the priority threshold value, and based on that the priority of the data is greater than the priority threshold value, transmitting the data through the sidelink on the unlicensed band with the second UE.

According to an embodiment, the method may further comprise decreasing the value of the backoff counter on a condition that a channel state is an idle state within the plurality of slot intervals.

According to an embodiment, the method may further comprise maintaining the value of the backoff counter on a condition that the channel state is a busy state within the plurality of slot intervals.

According to an embodiment, the size of the contention window may be set less than maximum size of the contention window.

According to an embodiment, a value related to quality of the sidelink communication may be set based on sidelink-reference signal received quality (SL-RSRQ).

According to an embodiment, the licensed band may include a band adjacent to unlicensed band.

According to an embodiment, the value related to the quality of the sidelink communication may be determined based on interference caused by communication in the unlicensed band.

According to an embodiment, the method may further comprise transmitting, based on the LBT procedure, a first message including a random access preamble through a physical random access channel (PRACH) in order to performing the sidelink communication with the second UE, receiving a second message from the second UE, wherein the second message includes information on resource scheduling, in response to the second message, transmitting a scheduled third message based on the LBT procedure, based on the third message, receiving a fourth message including contention resolution information from the second UE, and based on the fourth message, establishing a connection of the sidelink communication with the second UE on the licensed band.

According to various embodiments, a non-transitory computer readable medium may store one or more programs, wherein the one or more programs may include instructions, which, when being executed by at least one processor of a first user equipment (UE), cause the first UE to identify a value related to quality of sidelink communication while the first UE performs sidelink communication on licensed band with a second UE, determine to perform a listen before talk (LBT) procedure on a condition that the value related to the quality of the sidelink communication is less than or equal to a reference value, and perform the LBT procedure during performing the sidelink communication on the licensed band.

The user equipment according to the above-described embodiments may include a vehicle. When the user equipment according to the above-described embodiments is a vehicle, the side link communication according to the above-described embodiments may mean V2X communication. Accordingly, a detailed configuration of a vehicle, which is a user equipment for performing the above-described embodiments, may be described in FIGS. 19 to 21.

Figure 19:
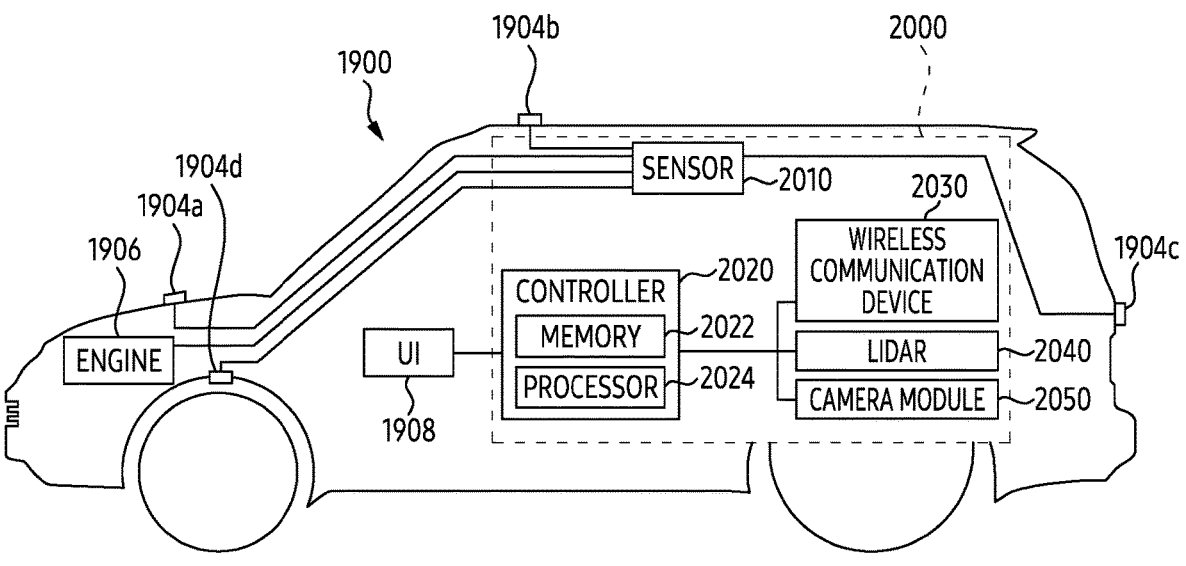
FIG. 19 illustrates an example of a user equipment according to various embodiments.

FIG. 19 illustrates an example of a user equipment according to various embodiments.

Figure 20:
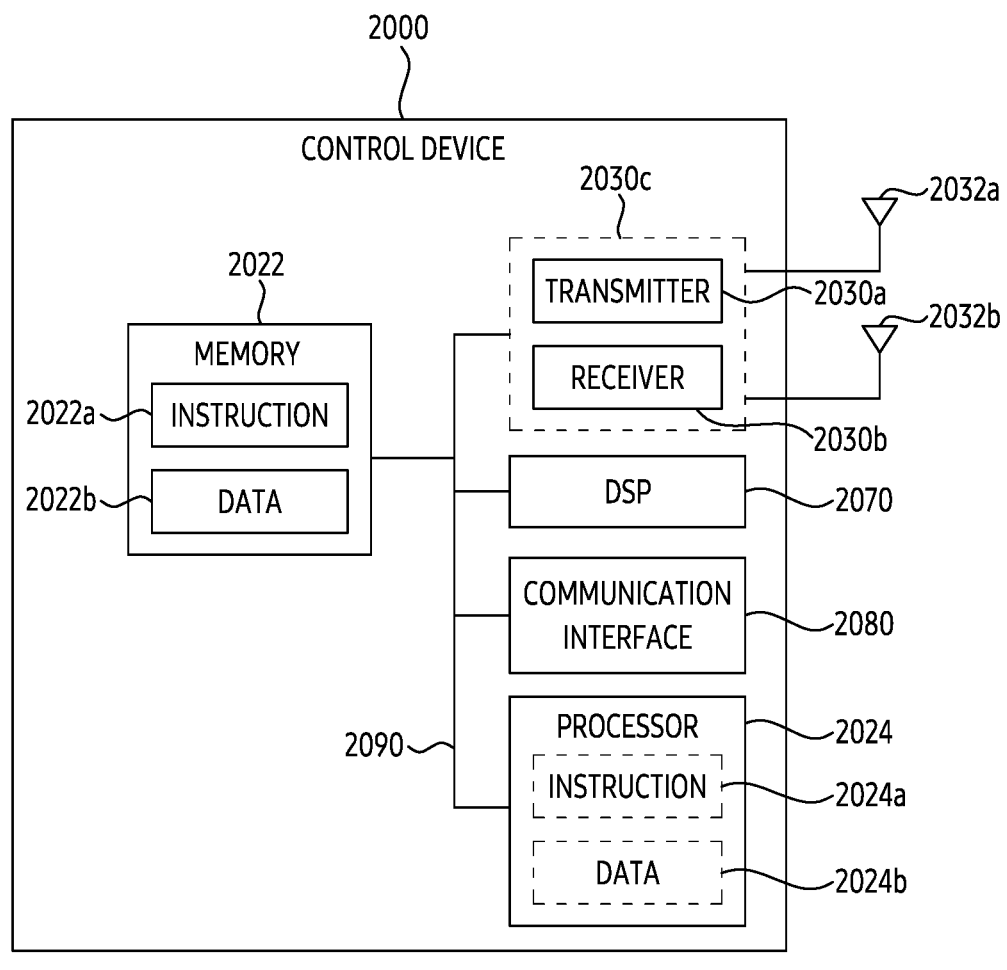
FIG. 20 illustrates an example of a functional configuration of a user equipment according to various embodiments.

FIG. 20 illustrates an example of a functional configuration of a user equipment according to various embodiments.

Figure 21:
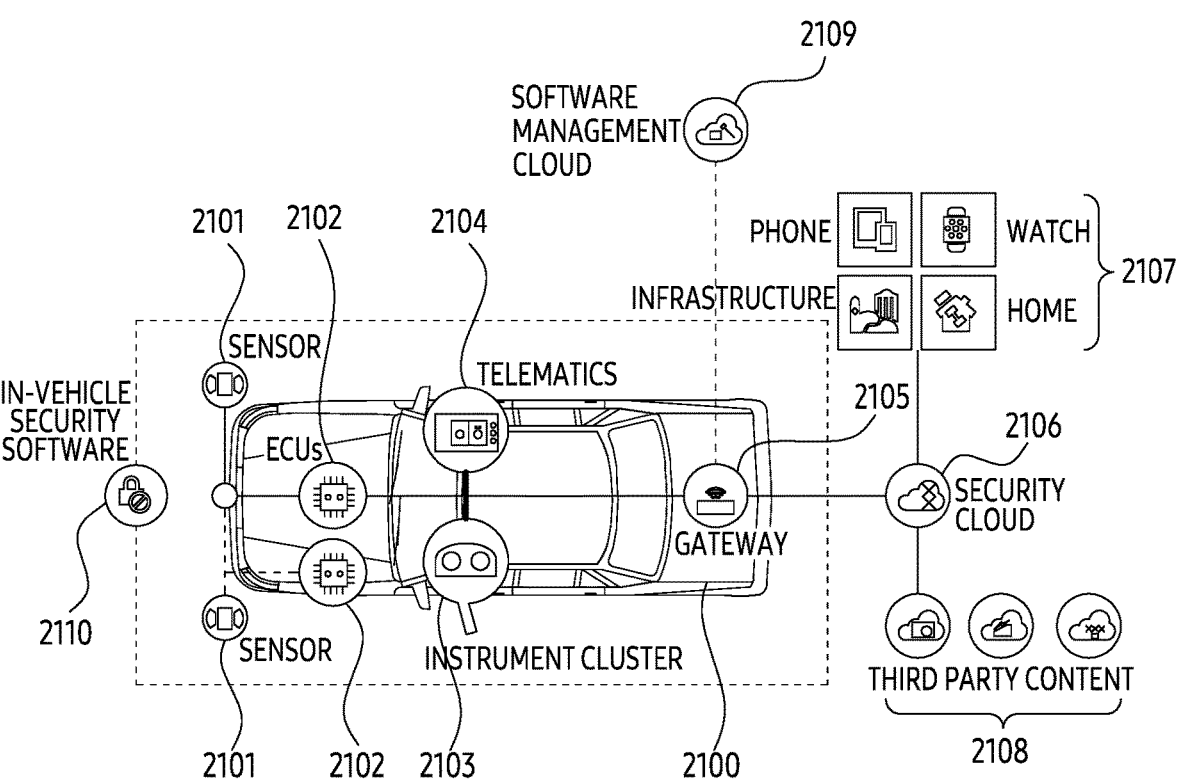
FIG. 21 illustrates an example of a gateway related to a user equipment according to various embodiments.

FIG. 21 illustrates an example of a gateway related to a user equipment according to various embodiments.

Referring to FIGS. 19 to 21, the control device 2000 according to various embodiments may be mounted on the vehicle 1900.

In various embodiments, the control device 2000 may include a controller 2020 including a memory 2022 and a processor 2024, and a sensor 2010.

According to various embodiments, the controller 2020 may be configured by a manufacturer of a vehicle or may be additionally configured to perform a function of autonomous driving after manufacturing. Alternatively, a configuration for continuously performing additional functions may be included through an upgrade of the controller 2020 configured during manufacturing.

The controller 2020 may transmit the control signal to the sensor 2010, the engine 1906, the user interface 1908, the wireless communication device 2030, the LIDAR 2040, and the camera module 2050 included in other components in the vehicle. In addition, although not shown, the controller 2020 may transmit a control signal to an acceleration device, a braking system, a steering device, or a navigation device related to driving of the vehicle.

In various embodiments, the controller 2020 may control the engine 1906, for example, detect the speed limit on the road where the autonomous vehicle 1900 is traveling, control the engine 1906 so that the driving speed does not exceed the speed limit, or control the engine 1906 to accelerate the driving speed of the autonomous vehicle 1900 within a speed limit. In addition, when sensing modules 1904a, 1904b, 1904c, and 1904d detect the environment outside the vehicle and transmit it to the sensor 2010, the controller 2020 may receive it and generate a signal for controlling the engine 1906 or the steering device (not shown) to control driving of the vehicle.

When there is another vehicle or obstruction in front of the vehicle, the controller 2020 may control the engine 1906 or the braking system to decelerate the driving vehicle and in addition to speed, control a trajectory, a driving path, and a steering angle. Alternatively, the controller 2020 may control driving of the vehicle by generating a necessary control signal according to recognition information of other external environments such as a driving lane of the vehicle and a driving signal.

By performing communication with neighboring vehicles or central servers in addition to generating their own control signals and transmitting commands for controlling peripheral devices through the received information, the controller 2020 may also control driving of the vehicle.

In addition, when the position of the camera module 2050 is changed or the angle of view is changed, accurate vehicle or lane recognition may be difficult, to prevent this, the controller 2020 may generate a control signal for controlling the camera module 2050 to perform calibration. In other words, even when the mounting position of the camera module 2050 is changed due to vibration or impact generated by the movement of the autonomous vehicle 1900, the controller 2020 may continuously maintain a normal mounting position, direction, and angle of view of the camera module 2050 by generating a calibration control signal to the camera module 2050. When the initial mounting position, direction, and angle of view information of the camera module 2050 stored in advance and the initial mounting position, direction, and angle of view information of the camera module 2050 measured while driving of the autonomous vehicle 1900 vary above a threshold value, the controller 2020 may generate a control signal to perform calibration of the camera module 2050.

According to various embodiments, the controller 2020 may comprise a memory 2022 and a processor 2024. The processor 2024 may execute the software stored in the memory 2022 according to the control signal of the controller 2020. Specifically, the controller 2020 stores data and instructions for scrambling audio data according to various embodiments in the memory 2022, and the instructions may be executed by processor 2024 to implement one or more methods disclosed herein.

In various embodiments, the memory 2022 may be stored in a recording medium executable by the processor 2024. The memory 2022 may store software and data through an appropriate internal and external device. The memory 2022 may be configured as a device connected to random access memory (RAM), read only memory (ROM), hard disk, and dongle.

The memory 2022 may store at least an operating system (OS), a user application, and executable commands. The memory 2022 may also store application data and array data structures.

The processor 2024 may be a controller, microcontroller, or state machine as a microprocessor or an appropriate electronic processor.

The processor 2024 may be implemented as a combination of computing devices, the computing device may be a digital signal processor, microprocessor, or configured in an appropriate combination thereof.

In addition, according to various embodiments, the control device 2000 may monitor internal and external features of the autonomous vehicle 1900 and detect a state thereof with at least one sensor 2010.

The sensor 2010 may be configured with at least one sensing module 1904 (e.g., sensor 1904*a*, sensor 1904*b*, sensor 1904*c*, and sensor 1904*d*), the sensing module 1904 may be implemented at a specific location of the autonomous vehicle 1900 according to the sensing purpose. For example, the sensing module 1904 may be located at a lower end, a rear end, a front end, an upper end, or a side end of the autonomous vehicle 1900, and may also be located at an internal component or tire of the vehicle.

Through this, the sensing module 1904 may detect information related to driving, such as engine 1906, tire, steering angle, speed, vehicle weight, and the like, as internal information of the vehicle. In addition, at least one sensing module 1904 may include an acceleration sensor, a gyroscope, an image sensor, a RADAR, an ultrasonic sensor, a LiDAR sensor and the like, and detect movement information of the autonomous vehicle 1900.

The sensing module 1904 may receive specific data on an external environmental state such as state information of a road on which the autonomous vehicle 1900 is located, surrounding vehicle information, weather, and the like, and may detect vehicle parameters accordingly. The detected information may be stored in the memory 2022, temporarily or in the long term, depending on the purpose.

According to various embodiments, the sensor 2010 may integrate and collect information of sensing modules 1904 for collecting information generated inside and outside the autonomous vehicle 1900.

The control device 2000 may further comprise a wireless communication device 2030.

The wireless communication device 2030 is configured to implement wireless communication between autonomous vehicles 1900. For example, the autonomous vehicle 1900 may communicate with a user's mobile phone, another wireless communication device 2030, another vehicle, a central device (traffic control device), a server, and the like. The wireless communication device 2030 may transmit and receive a wireless signal according to a connection wireless protocol. A wireless communication protocols may be Wi-Fi, Bluetooth, Long-Term Evolution (LTE), Code Division Multiple Access (CDMA), Wideband Code Division Multiple Access (WCDMA), Global Systems for Mobile Communications (GSM), and the communication protocol is not limited thereto.

In addition, according to various embodiments, in addition, according to various embodiments, the autonomous vehicle 1900 may implement communication between vehicles through the wireless communication device 2030. In other words, the wireless communication device 2030 may communicate with other vehicles and other vehicles on the road through V2V (vehicle-to-vehicle communication or V2X). The autonomous vehicle 1900 may transmit and receive information such as a driving warning and traffic information through communication between vehicles and may request information or receive requests from other vehicles. For example, the wireless communication device 2030 may perform V2V communication with a dedicated short-range communication (DSRC) device or a cellular-V2V (C-V2V) device. Besides communication between vehicles, V2X (vehicle to everything communication) between the vehicle and other objects (e.g., electronic devices carried by pedestrians) may also be implemented through the wireless communication device 2030.

In addition, the control device 2000 may comprise the LIDAR device 2040. The LIDAR device 2040 may detect an object around the autonomous vehicle 1900 during operation Using data sensed through a LIDAR sensor. The LIDAR device 2040 may transmit the detected information to the controller 2020, and the controller 2020 may operate the autonomous vehicle 1900 according to the detection information. For example, when there is a vehicle ahead moving at low speed in the detection information, the controller 2020 may command the vehicle to slow down through the engine 1906. Alternatively, the vehicle may be ordered to slow down according to the curvature of the curve into which it is entering.

The control device 2000 may further comprise a camera module 2050. The controller 2020 may extract object information from an external image photographed by the camera module 2050 and allow the controller 2020 to process information on the information.

In addition, the control device 2000 may further comprise imaging devices for recognizing an external environment. In addition to the LIDAR 2040, RADAR, GPS devices, driving distance measuring devices (Odometry), and other computer vision devices may be used, and these devices operate selectively or simultaneously as needed to enable more precise detection.

The autonomous vehicle 1900 may further comprise a user interface 1908 for user input to the control device 2000 described above. User interface 1908 may allow the user to input information with appropriate interaction. For example, it may be implemented as a touch screen, a keypad, an operation button, or the like. The user interface 1908 may transmit an input or command to the controller 2020, and the controller 2020 may perform a vehicle control operation in response to the input or command.

In addition, the user interface 1908 may perform communication with the autonomous vehicle 1900 through the wireless communication device 2030 which is a device outside the autonomous vehicle 1900. For example, the user interface 1908 may enable interworking with a mobile phone, tablet, or other computer device.

Furthermore, according to various embodiments, although the autonomous vehicle 1900 is described as including the engine 1906, may also comprise other types of propulsion systems. For example, the vehicle may be operated with electrical energy and may be operated through hydrogen energy, or a hybrid system combined with the same. Accordingly, the controller 2020 may include a propulsion mechanism according to a propulsion system of the autonomous vehicle 1900 and provide a control signal accordingly to the components of each propulsion mechanism.

Hereinafter, a detailed configuration of the control device 2000 for scrambling audio data according to various embodiments will be described in more detail with reference to FIG. 20.

The control device 2000 includes a processor 2024. The processor 2024 may be a general purpose single or multi-chip microprocessor, a dedicated microprocessor, a microcontroller, a programmable gate array, or the like. The processor may be referred to as a central processing unit (CPU). In addition, according to various embodiments, the processor 2024 may be used as a combination of a plurality of processors.

The control device 2000 also comprises a memory 2022. The memory 2022 may be any electronic component capable of storing electronic information. The memory 2022 may also include a combination of memories 2022 in addition to a single memory.

According to various embodiments, data and instructions 2022a for scrambling audio data may be stored in the memory 2022. When the processor 2024 executes the instructions 2022a, the instructions 2022a and all or part of the data 2022b required for executing the instructions may be loaded onto the processor 2024 (e.g., the instructions 2024a, the data 2024b).

The control device 2000 may include a transmitter 2030a, a receiver 2030b, or a transceiver 2030c for allowing transmission and reception of signals. One or more antennas 2032a and 2032b may be electrically connected to a transmitter 2030a, a receiver 2030b, or each transceiver 2030c, and may additionally comprise antennas.

The control device 2000 may comprise a digital signal processor DSP 2070. The DSP 2070 may enable the vehicle to quickly process the digital signal.

The control device 2000 may comprise a communication interface 2080. The communication interface 2080 may comprise one or more ports and/or communication modules for connecting other devices to the control device 2000. The communication interface 2080 may allow the user and the control device 2000 to interact.

Various configurations of the control device 2000 may be connected together by one or more buses 2090, the buses 2090 may comprise a power bus, a control signal bus, a state signal bus, a data bus, and the like. Under the control of the processor 2024, the configurations may transmit mutual information and perform a desired function through the bus 2090.

Meanwhile, in various embodiments, the control device 2000 may be related to a gateway for communication with the secure cloud. For example, referring to FIG. 21, the control device 2000 may be related to the gateway 2105 for providing information obtained from at least one of the components 2101 to 2104 of the vehicle 2100 to the secure cloud 2106. For example, the gateway 2105 may be comprised in the control device 2000. For another example, gateway 2105 may be configured as a separate device in vehicle 2100 distinguished from control device 2000. Gateway 2105 connects software management cloud 2109 having different networks, secure cloud 2106 and network in secured vehicle 2100 by in-vehicle security software 2010 to be enable communication.

For example, component 2101 may be a sensor. For example, the sensor may be used to obtain information on at least one of a state of the vehicle 2100 or a state around the vehicle 2100. For example, component 2101 may comprise a sensor 2010.

For example, component 2102 may be electronic control units (ECUs). For example, the ECUs may be used for engine control, transmission control, airbag control, and tire pressure management.

For example, component 2103 may be an instrument cluster. For example, the instrument cluster may refer to a panel positioned in front of a driver's seat among dashboards. For example, the instrument cluster may be configured to show information necessary for driving to a driver (or passenger). For example, the instrument cluster may be used to display at least one of Visual elements for indicating revolution per minute (RPM), the speed of the vehicle 2100, the amount of residual fuel, gear conditions and information obtained through component 2101.

For example, component 2104 may be a telematics device. For example, the telematics device may refer to a device that provides various mobile communication services such as location information and safe driving in a vehicle 2100 by combining wireless communication technology and global positioning system (GPS) technology. For example, the telematics device may be used to connect the driver, the cloud (e.g., secure cloud 2106), and/or the surrounding environment to the vehicle 2100. For example, the telematics device may be configured to support high bandwidth and low latency for technology of 5G NR standard (e.g., V2X technology of 5G NR). For example, the telematics device may be configured to support autonomous driving of the vehicle 2100.

For example, gateway 2105 may be used to connect a network in the vehicle 2100 to a software management cloud 2109, which are out-of-vehicle networks and a secure cloud 2106. For example, the software management cloud 2109 may be used to update or manage at least one software required for driving and managing the vehicle 2100. For example, the software management cloud 2109 may be linked with in-car security software 2110 installed in the vehicle. For example, in-vehicle security software 2110 may be used to provide a security function in the vehicle 2100. For example, the in-vehicle security software 2110 may encrypt data transmitted and received through the in-vehicle network using an encryption key obtained from an external authorized server for encryption of the in-vehicle network. In various embodiments, the encryption key used by in-vehicle security software 2110 may be generated corresponding to vehicle identification information (vehicle license plate, or information uniquely assigned to each user (e.g., user identification information, vehicle identification number).

In various embodiments, gateway 2105 may transmit data encrypted by in-vehicle security software 2110 to software management cloud 2109 and/or secure cloud 2106 based on the encryption key. Software management cloud 2109 and/or secure cloud 2106 may identify that data was received from which vehicle or from which user, by decrypting the data encrypted by the encryption key of the security software 2110 in the vehicle using a decryption key capable of decrypting the data. For example, since the decryption key is a unique key corresponding to the encryption key, the software management cloud 2109 and/or the secure cloud 2106 may identify a sender (e.g., a vehicle or a user) of data based on the decryption key.

For example, gateway 2105 may be configured to support in-vehicle security software 2110 and may be related to control device 2000. For example, gateway 2105 may be related to control device 2000 to support a connection between client device 2107 connected to secure cloud 2106 and control device 2000. For another example, gateway 2105 may be related to control device 2000 to support a connection between third-party cloud 2108 connected to secure cloud 2106 and control device 2000. However, it is not limited thereto.

In various embodiments, the gateway 2105 may be used to connect the vehicle 2100 with the software management cloud 2109 for managing the operating software of the vehicle 2100. For example, the software management cloud 2109 may monitor whether update of the operating software of the vehicle 2100 is required and provide data for updating the operating software of the vehicle 2100 through the gateway 2105 based on monitoring the request for updating the operating software of the vehicle 2100. For another example, the software management cloud 2109 may receive a user request for updating the operating software of the vehicle 2100 from the vehicle 2100 through the gateway 2105 and provide data for updating the operating software of the vehicle 2100 based on the reception. However, it is not limited thereto.

The device described above may be implemented as a hardware component, a software component, and/or a combination of hardware components and software components. For example, the devices and components described in the embodiments may be implemented using one or more general purpose computers or special purpose computers such as processor, controller, ALU (arithmetic logic unit), digital signal processor, microcomputer, FPGA (field programmable gate array), PLU (programmable logic unit), microprocessor or any other device capable of executing and responding to instructions. The processing device may perform an operating system (OS) and one or more software applications performed on the operating system. In addition, the processing device may access, store, manipulate, process, and generate data in response to execution of the software. For convenience of understanding, although it may be described that one processing device is used, a person skilled in the art may see that the processing device may include a plurality of processing elements and/or a plurality of types of processing elements. For example, the processing device may include a plurality of processors or one processor and one controller. In addition, other processing configurations such as parallel processors are possible.

The software may comprise a computer program, code, instruction, or a combination of one or more of these, configure the processing device to operate as desired, or command the processing device independently or collectively. Software and/or data may be embodied in any type of machine, component, physical device, computer storage medium, or device to be interpreted by a processing device or to provide instructions or data to a processing device. The software may be distributed on networked computer systems and stored or executed in a distributed manner. Software and data may be stored in one or more computer-readable recording media.

The method according to the embodiment may be implemented in the form of a program command that may be performed through various computer means and recorded on a computer-readable medium. In this case, the medium may continue to store a computer-executable program, or may temporarily store the program for execution or download. In addition, the medium may be various recording or storage means in which a single or several hardware is combined, and may not be limited to a medium directly connected to a computer system, but may be distributed over a network. Examples of media comprise magnetic media such as hard disks, floppy disks, and magnetic tape, optical recording media such as CD-ROM and DVD, magneto-optical medium, such as a floptical disk, anything configured to store program instructions, including ROM, RAM, flash memory, etc. In addition, examples of other media include app stores that distribute applications, sites that supply or distribute other various software, and recording media or storage media managed by servers.

Although embodiments have been described according to limited embodiments and drawings as above, various modifications and modifications are possible from the above description to those of ordinary skill in the art. For example, appropriate results may be achieved if the described techniques are performed in a different order from the described methods, and/or components such as systems, structures, devices, and circuits are combined or combined in a different form from the described methods.

Thus, other implementations, other embodiments, and those equivalent to the claims also fall within the scope of the claims to be described later.

What is claimed is:

1. A first user equipment (UE) comprising:
a transceiver to transmit and receive a wireless signal; and
a processor connected with the transceiver, wherein the processor is configured to:
identify a value related to quality of sidelink communication while the first UE performs sidelink communication on licensed band with a second UE,
determine to perform a listen before talk (LBT) procedure on a condition that the value related to the quality of the sidelink communication is less than or equal to a reference value, and
perform the LBT procedure during performing the sidelink communication on the licensed band.

2. The first UE according to claim 1, wherein the processor is configured to:
set, based on the LBT procedure, a backoff counter within a contention window,
decrease the backoff counter within a plurality of slot intervals,
determine, based on a value of the backoff counter being a first value, channel occupancy time, and
transmit data to the second UE on the licensed band within the channel occupancy time.

3. The first UE according to claim 2, wherein the processor is further configured to decrease the value of the backoff counter in a state in which a channel state is an idle state within the plurality of slot intervals.

4. The first UE according to claim 2, wherein the processor is further configured to maintain the value of the backoff counter in a state in which the channel state is a busy state within the plurality of slot intervals.

5. The first UE according to claim 2, wherein the processor is further configured to:
identify that the data is not transmitted to the second UE, and
increase size of the contention window.

6. The first UE according to claim 5, wherein the size of the contention window is set less than maximum size of the contention window.

7. The first UE according to claim 1, wherein a value related to quality of the sidelink communication is set based on sidelink-reference signal received quality (SL-RSRQ).

8. The first UE according to claim 1, wherein the licensed band includes a band adjacent to unlicensed band, and wherein the value related to the quality of the sidelink communication is determined based on interference caused by communication in the unlicensed band.

9. The first UE according to claim 1, wherein the sidelink communication is established based on another LBT procedure, before identifying the value related to the quality of the sidelink communication; and wherein the processor is configured to:

transmit, based on the another LBT procedure, a first message including a random access preamble through a physical random access channel (PRACH) in order to perform the sidelink communication with the second UE, receive a second message from the second UE, wherein the second message includes information on resource scheduling, in response to the second message, transmit a scheduled third message based on the another LBT procedure, based on the third message, receive a fourth message including contention resolution information from the second UE, and based on the fourth message, establish a connection of the sidelink communication with the second UE on the licensed band.

10. The first UE according to claim 1, wherein the sidelink communication is established based on another LBT procedure, before identifying the value related to the quality of the sidelink communication; and wherein the processor is configured to:

transmit, based on the another LBT procedure, a message A including a random access preamble and information for performing a collision resolution procedure, to perform the sidelink communication with the second UE, receive, based on the message A, a message B including information on resource scheduling and collision resolution information from the second UE, and establish, based on the message B, a connection of sidelink communication with the second UE on the licensed band.

11. A method for operating a first user equipment (UE), the method comprising:

identifying a value related to quality of sidelink communication while the first UE performs sidelink communication on licensed band with a second UE, determining to perform a listen before talk (LBT) procedure on a condition that the value related to the quality of the sidelink communication is less than or equal to a reference value, and performing the LBT procedure during performing the sidelink communication on the licensed band.

12. The method according to claim 11, comprising:

identifying priority of the data, identifying whether the priority of the data is greater than the priority threshold value, and based on that the priority of the data is greater than the priority threshold value, transmitting the data through the sidelink on the unlicensed band with the second UE.

13. The method according to claim 12, further comprising decreasing the value of the backoff counter in a state in which a channel state is an idle state within the plurality of slot intervals.

14. The method according to claim 12, further comprising maintaining the value of the backoff counter in a state in which the channel state is a busy state within the plurality of slot intervals.

15. The method according to claim 12, further comprising:

identifying that the data is not transmitted to the second UE, and increasing size of the contention window.

16. The method according to claim 15, wherein the size of the contention window is set less than maximum size of the contention window.

17. The method according to claim 11, wherein a value related to quality of the sidelink communication is set based on sidelink-reference signal received quality (SL-RSRQ).

18. The method according to claim 11, wherein the licensed band includes a band adjacent to unlicensed band, and wherein the value related to the quality of the sidelink communication is determined based on interference caused by communication in the unlicensed band.

19. The method according to claim 11, wherein the sidelink communication is established based on another LBT procedure, before identifying the value related to the quality of the sidelink communication; and wherein the method further comprises:

transmitting, based on the another LBT procedure, a first message including a random access preamble through a physical random access channel (PRACH) in order to perform the sidelink communication with the second UE, receiving a second message from the second UE, wherein the second message includes information on resource scheduling, in response to the second message, transmitting a scheduled third message based on the another LBT procedure, based on the third message, receiving a fourth message including contention resolution information from the second UE, and based on the fourth message, establishing a connection of the sidelink communication with the second UE on the licensed band.

20. A non-transitory computer readable medium storing one or more programs, the one or more programs including instructions, which, when being executed by at least one processor of a first user equipment (UE), cause the first UE to:

identify a value related to quality of sidelink communication while the first UE performs sidelink communication on licensed band with a second UE, determine to perform a listen before talk (LBT) procedure on a condition that the value related to the quality of the sidelink communication is less than or equal to a reference value, and perform the LBT procedure during performing the sidelink communication on the licensed band.

* * * * *